(12) United States Patent
Derichs et al.

(10) Patent No.: US 12,411,562 B2
(45) Date of Patent: Sep. 9, 2025

(54) PASSIVE DEVICE WITH COMPRESSIBLE PRESSURE ASSEMBLY FOR Z-DIRECTION CAPACITANCE DETECTION

(71) Applicant: SigmaSense, LLC., Austin, TX (US)

(72) Inventors: Kevin Joseph Derichs, Buda, TX (US); Michael Shawn Gray, Elgin, TX (US); Grant Howard McGibney, Calgary (CA)

(73) Assignee: SigmaSense, LLC., Austin, TX (US)

(*) Notice: Subject to any disclaimer, the term of this patent is extended or adjusted under 35 U.S.C. 154(b) by 0 days.

(21) Appl. No.: 18/785,957

(22) Filed: Jul. 26, 2024

(65) Prior Publication Data

US 2024/0385703 A1    Nov. 21, 2024

Related U.S. Application Data

(63) Continuation of application No. 18/191,932, filed on Mar. 29, 2023, now Pat. No. 12,050,740.
(Continued)

(51) Int. Cl.
*G06F 3/0354* (2013.01)
*G06F 3/039* (2013.01)

(52) U.S. Cl.
CPC ........ *G06F 3/03545* (2013.01); *G06F 3/0393* (2019.05)

(58) Field of Classification Search
CPC .................... G06F 3/03545; G06F 3/0393
See application file for complete search history.

(56) References Cited

U.S. PATENT DOCUMENTS

| 5,437,178 A | 8/1995 | Esin et al. |
| 6,218,972 B1 | 4/2001 | Groshong |

(Continued)

FOREIGN PATENT DOCUMENTS

| CN | 103995626 A | 8/2014 |
| CN | 104182105 A | 12/2014 |

(Continued)

OTHER PUBLICATIONS

Baker; How delta-sigma ADCs work, Part 1; Analog Applications Journal; Oct. 1, 2011; 6 pgs.
(Continued)

*Primary Examiner* — Afroza Chowdhury
(74) *Attorney, Agent, or Firm* — Garlick & Markison; Patricia M. Healy

(57) ABSTRACT

A passive device includes a non-conductive housing including an upper and lower housing section, a conductive section housed in the upper housing section, and a pressure assembly housed in the lower housing section. The pressure assembly includes a compressible conductor, a mounting structure coupled to the compressible conductor and the upper housing section, a conductive contact coupled to the compressible conductor and the conductive section, and a firm spherical conductor. The firm spherical conductor includes an upper contact point for contact with the compressible conductor and a lower contact point for contact with the touchscreen. When z-direction pressure is applied on the firm spherical conductor, the compressive conductor compresses against the upper contact point. Compression of the compressive conductor increases surface area between the firm spherical conductor and the compressive conductor. The increase in surface area increases the capacitance of the passive device.

12 Claims, 19 Drawing Sheets

Related U.S. Application Data

(60) Provisional application No. 63/385,286, filed on Nov. 29, 2022.

(56) References Cited

U.S. PATENT DOCUMENTS

| | | |
|---|---|---|
| 6,665,013 B1 | 12/2003 | Fossum et al. |
| 7,476,233 B1 | 1/2009 | Wiener et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,537,110 B2 | 9/2013 | Kruglick |
| 8,547,114 B2 | 10/2013 | Kremin |
| 8,587,535 B2 | 11/2013 | Oda et al. |
| 8,625,726 B2 | 1/2014 | Kuan |
| 8,657,681 B2 | 2/2014 | Kim |
| 8,966,400 B2 | 2/2015 | Yeap |
| 8,982,097 B1 | 3/2015 | Kuzo et al. |
| 9,081,437 B2 | 7/2015 | Oda |
| 9,201,547 B2 | 12/2015 | Elias |
| 10,007,335 B2 | 6/2018 | Lee |
| 11,989,378 B2* | 5/2024 | Derichs .............. G06F 3/04186 |
| 12,050,740 B2* | 7/2024 | Derichs ................ G06F 3/0393 |
| 2003/0052657 A1 | 3/2003 | Koernle et al. |
| 2005/0235758 A1 | 10/2005 | Kowal et al. |
| 2011/0063154 A1 | 3/2011 | Hotelling et al. |
| 2011/0298745 A1 | 12/2011 | Souchkov |
| 2012/0146957 A1 | 6/2012 | Dunagan |
| 2012/0278031 A1 | 11/2012 | Oda |
| 2013/0278447 A1 | 10/2013 | Kremin |
| 2014/0267192 A1 | 9/2014 | Matsuura |
| 2014/0327644 A1 | 11/2014 | Mohindra |
| 2015/0091847 A1 | 4/2015 | Chang |
| 2015/0116289 A1 | 4/2015 | Stern et al. |
| 2015/0331506 A1 | 11/2015 | Vandermeijden |
| 2015/0346889 A1 | 12/2015 | Chen |
| 2016/0188049 A1 | 6/2016 | Yang et al. |
| 2017/0300138 A1 | 10/2017 | Qian |
| 2018/0157354 A1 | 6/2018 | Blondin et al. |
| 2018/0217684 A1 | 8/2018 | Mishalov et al. |
| 2018/0275824 A1 | 9/2018 | Li |
| 2018/0356911 A1* | 12/2018 | Kim .................... G06F 3/03545 |
| 2022/0342513 A1 | 10/2022 | Derichs |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |
| JP | 2014197384 A | 10/2014 |
| KR | 1020160056682 A | 5/2016 |
| WO | 2018200169 A1 | 11/2018 |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; Jun. 13, 2023; 7 pgs.

International Searching Authority; International Search Report and Written Opinion; International Application No. PCT/US2023/080528; Mar. 22, 2024; 9 pgs.

* cited by examiner data communication system 10 computing device 12

DSC = drive-sense circuit computing device 12 touchscreen 25 no touch contact

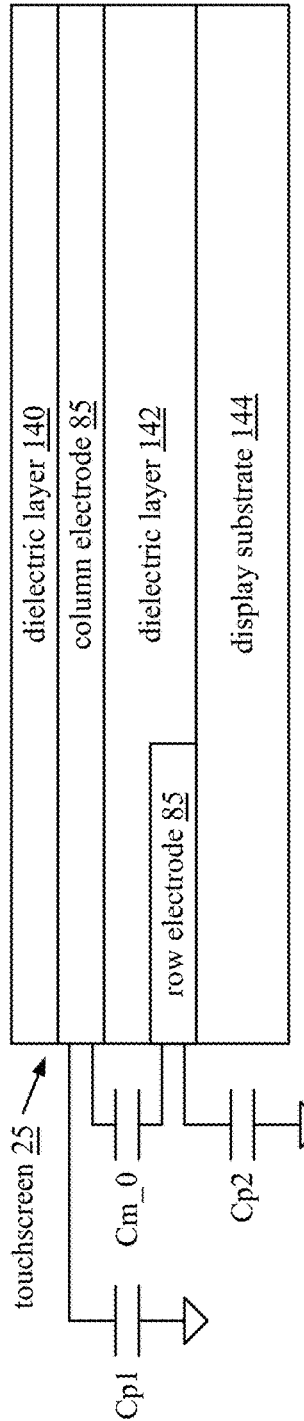
FIG. 11A
no touch
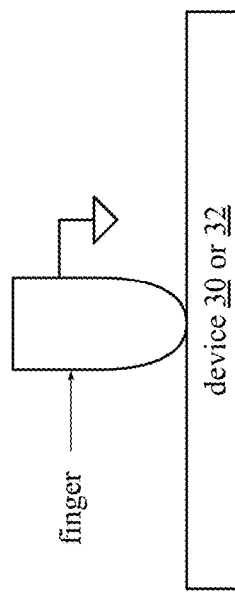
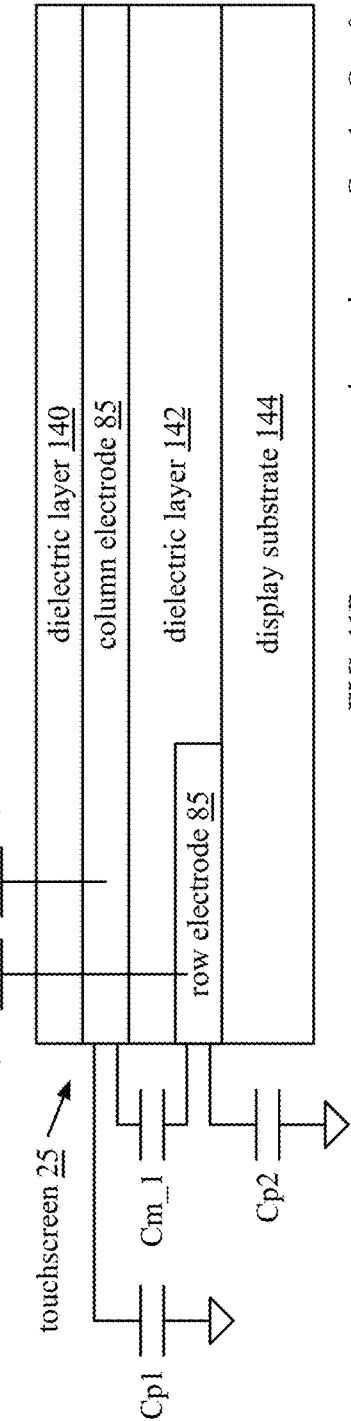
FIG. 11B
contact

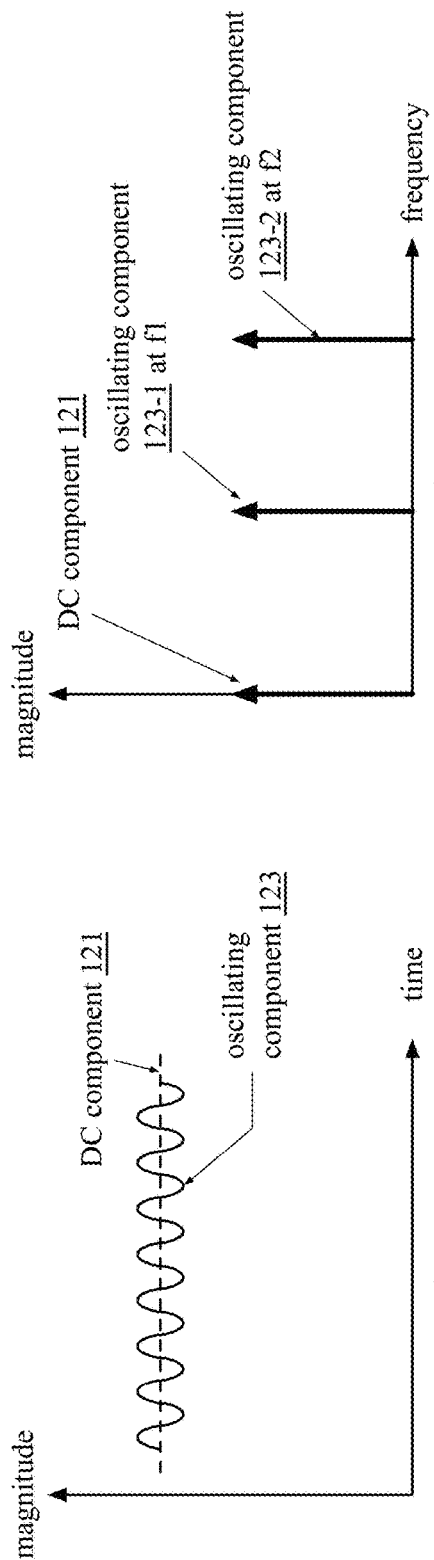
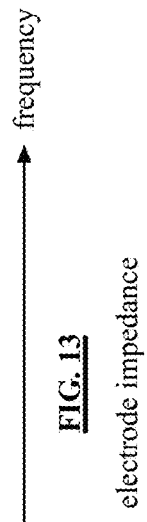
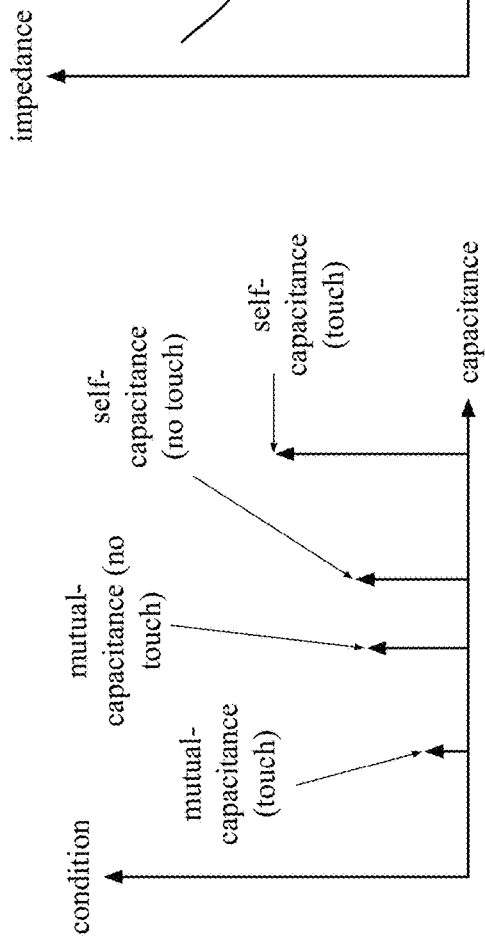

no touch with touch touchscreen 25 device and palm touch touchscreen 25

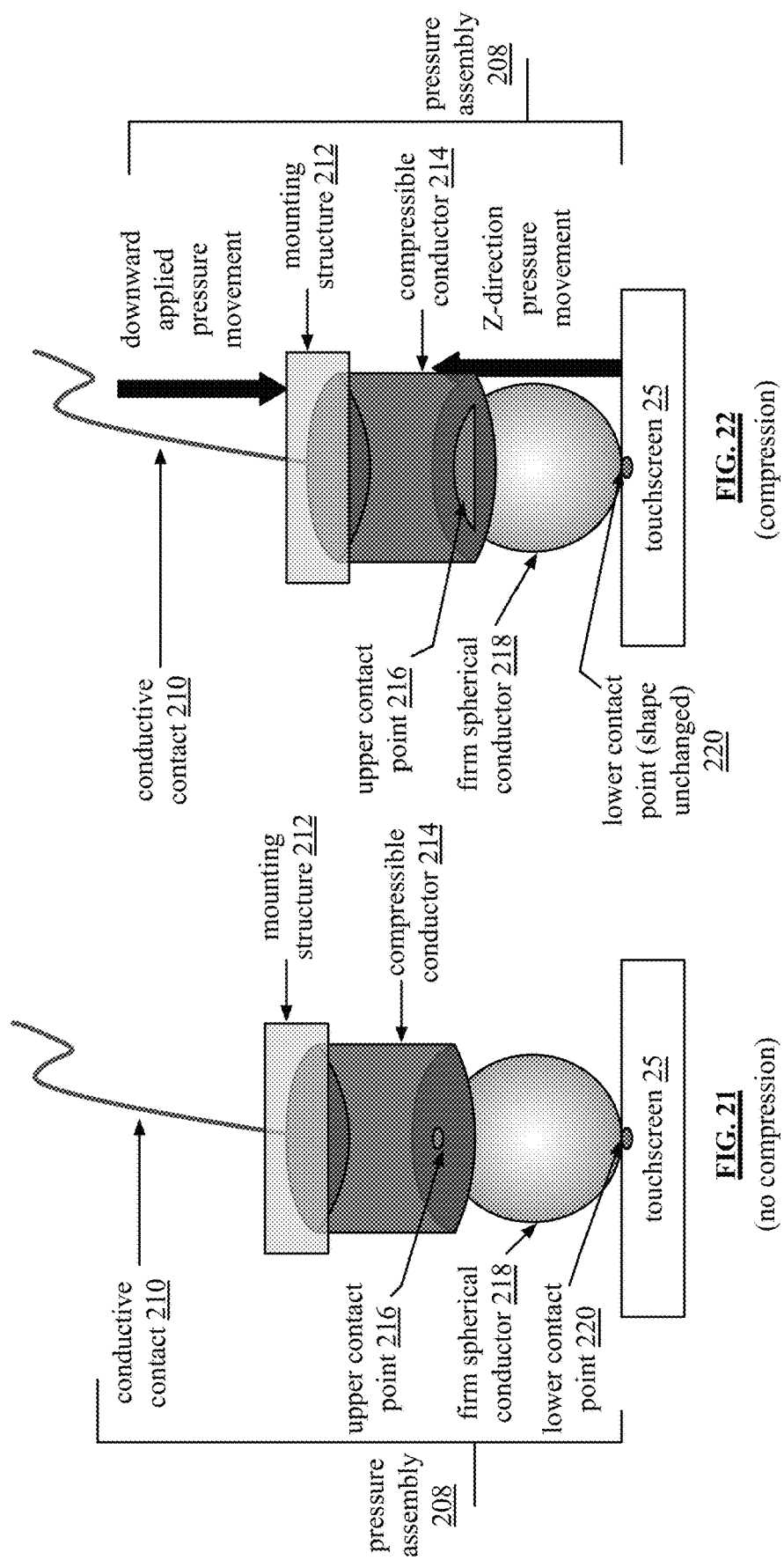

passive device 222

PASSIVE DEVICE WITH COMPRESSIBLE PRESSURE ASSEMBLY FOR Z-DIRECTION CAPACITANCE DETECTION

CROSS-REFERENCE TO RELATED APPLICATIONS

The present U.S. Utility Patent Application claims priority pursuant to 35 U.S.C. § 120 as a continuation of U.S. Utility application Ser. No. 18/191,932, entitled "PASSIVE DEVICE WITH COMPRESSIBLE PRESSURE ASSEMBLY FOR Z-DIRECTION CAPACITANCE DETECTION", filed Mar. 29, 2023, which claims priority pursuant to 35 USC § 119(e) to U.S. Provisional Application Ser. No. 63/385,286, entitled "FREQUENCY DETECTION FOR VALID AND INVALID TOUCH RECOGNITION", filed Nov. 29, 2022, each of which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensing pressure data of a passive device via a touchscreen.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touchscreens, industrial plants, appliances, motors, checkout counters, etc., for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that supports millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touchscreen. As yet another example, the computing device processes the sensor signals to determine various data points in a production line of a product.

Computers include user interfaces to receive data from a user and to output data to a user. A common user interface is a graphical user interface (GUI) that provides images, or icons, for various types of data input (e.g., select a file, edit a word, type a character, draw a picture, look at a photo, format a document, etc.). In an example, the user selects an icon by manipulating a mouse to align a cursor with an icon and then "selects" the icon. In another example, the user selects an icon by touching the screen with the user's finger or with a special pen.

A passive pen is made of conductive material and conducts electrical charge from a user's finger to a touchscreen just like a finger would. XY location of a passive pen on a touchscreen can be determined, but the localized Z-pressure applied on a passive pen tip will make an enlarged contact spot due to deflection of the tip. The deflection can be interpreted as relative pressure and not an absolute measurement. In active pens, absolute pressure measurements are interpreted by an onboard calculation that will retransmit the pressure value to a touch sensor.

BRIEF DESCRIPTION OF THE SEVERAL VIEWS OF THE DRAWING(S)

FIG. 11A is a cross section schematic block diagram of an embodiment of a touchscreen;

FIG. 11B is a cross section schematic block diagram of an embodiment of a touchscreen;

FIG. 12 is an example graph that plots condition verses capacitance for an electrode of a touchscreen;

FIG. 13 is an example graph that plots impedance verses frequency for an electrode of a touchscreen;

FIG. 14 is a time domain example graph that plots magnitude verses time for an analog reference signal;

FIG. 15 is a frequency domain example graph that plots magnitude verses frequency for an analog reference signal;

FIG. 21 is a schematic block diagram of an embodiment of a pressure assembly;

FIG. 22 is a schematic block diagram of another embodiment of a pressure assembly.

DETAILED DESCRIPTION OF THE INVENTION

Figure 1:
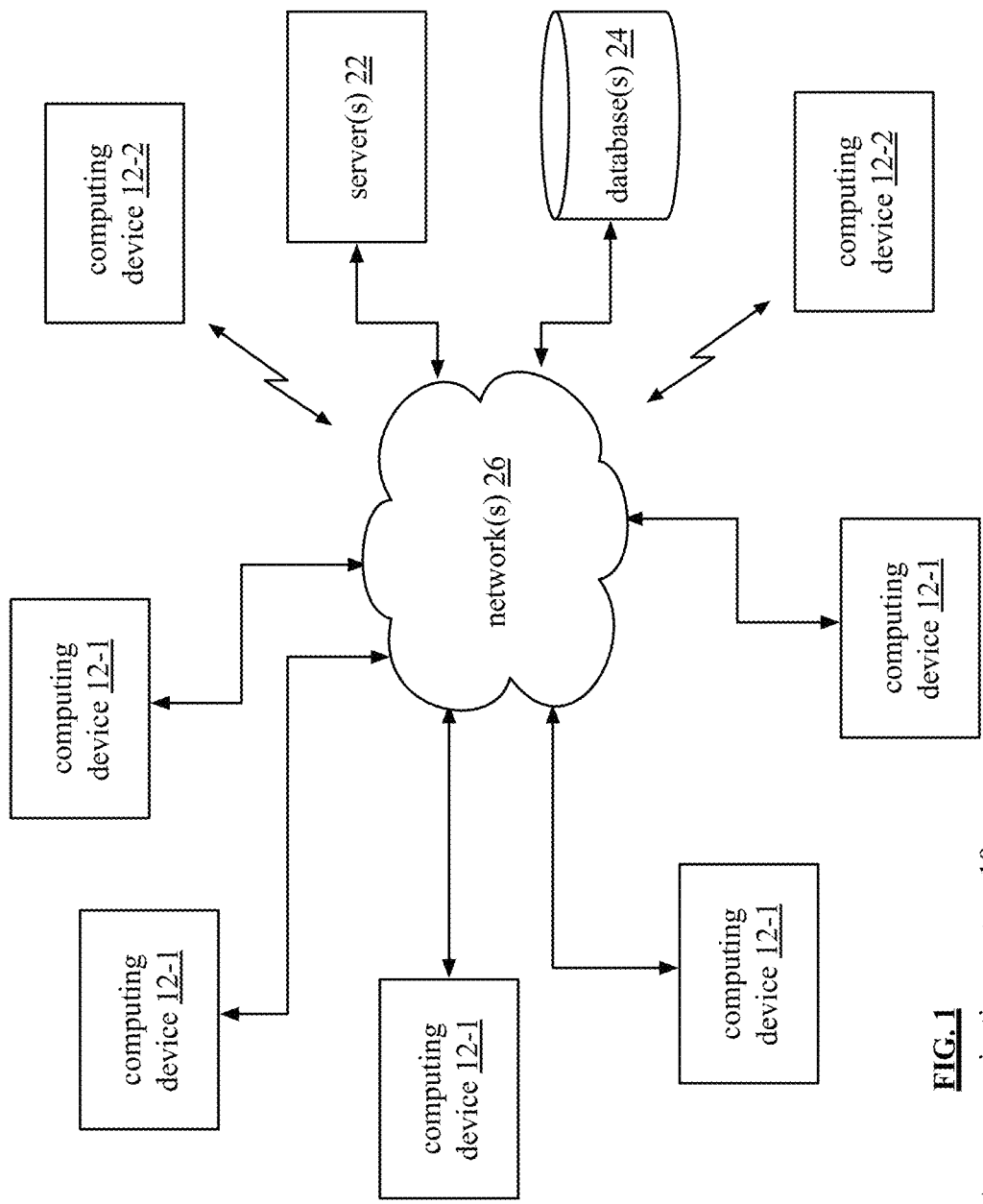
FIG. 1 is a schematic block diagram of an embodiment of a data communication system.

FIG. 1 is a schematic block diagram of an embodiment of a data communication system 10 that includes a plurality of wired computing devices 12-1, a plurality of wireless computing devices 12-2, one or more servers 22, one or more databases 24, and one or more networks 26. Embodiments of computing devices 12-1 and 12-2 are similar in construct and/or functionality with a difference being the computing devices 12-1 couple to the network(s) 26 via a wired network card and the wireless computing devices 12-2 couple to the network(s) 26 via a wireless connection. In an embodiment, a computing device can have both a wired network card and a wireless network card such that it is both computing devices 12-1 and 12-2.

A computing device 12-1 and/or 12-2 may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12-1 and/or 12-2 will be discussed in greater detail with reference to one or more of FIGS. 2-5.

A server 22 is a special type of computing device that is optimized for processing large amounts of data requests in parallel. A server 22 includes similar components to that of the computing devices 12-1 and/or 12-2 with more robust processing modules, more main memory, and/or more hard drive memory (e.g., solid state, hard drives, etc.). Further, a server 22 is typically accessed remotely; as such it does not generally include user input devices and/or user output devices. In addition, an embodiment of a server is a standalone separate computing device and/or may be a cloud computing device.

A database 24 is a special type of computing device that is optimized for large scale data storage and retrieval. A database 24 includes similar components to that of the computing devices 12-1 and/or 12-2 with more hard drive memory (e.g., solid state, hard drives, etc.) and potentially with more processing modules and/or main memory. Further, a database 24 is typically accessed remotely; as such it does not generally include user input devices and/or user output devices. In addition, an embodiment of a database 24 is a standalone separate computing device and/or may be a cloud computing device.

The network(s) 26 includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

The computing devices 12 communicate in a wired manner and/or wireless manner within the data communication system 10. For example, the wired computing devices 12-1 and/or the wireless computing devices 12-2 include or connect to one or more touchscreens with sensors and drive-sense circuits for communicating touch sense data within the data communication system 10. The touch sense data communication is between computing devices and/or is within a computing device.

Figure 2:
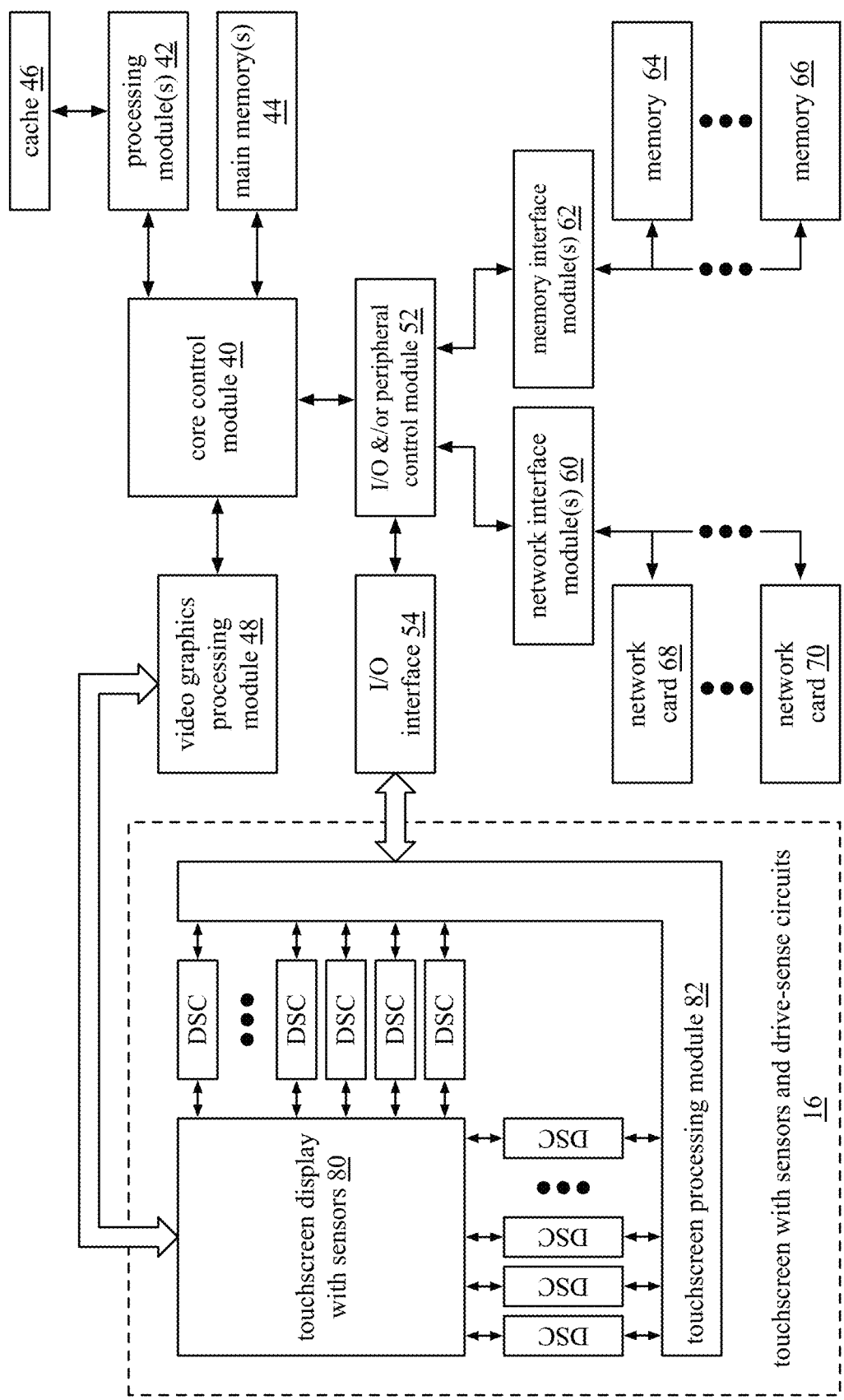
FIG. 2 is a schematic block diagram of an embodiment of a computing device.

FIG. 2 is a schematic block diagram of an embodiment of a computing device 12 (e.g., computing device 12-1 and/or 12-2 of FIG. 1). The computing device 12 includes a touchscreen with sensors and drive-sense circuits 16 ("touchscreen"), a core control module 40, one or more processing modules 42, one or more main memories 44, cache memory 46, a video graphics processing module 48, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

The touchscreen 16 includes a touchscreen display with sensors 80 ("touchscreen display"), a plurality of drive-sense circuits (DSC), and a touchscreen processing module 82. In general, the sensors (e.g., electrodes, capacitor sensing cells, capacitor sensors, inductive sensor, etc.) detect a proximal touch of the screen. For example, when one or more fingers touch the screen, capacitance of sensors proximal to the touch(es) are affected (e.g., impedance changes). The drive-sense circuits (DSC) coupled to the affected sensors detect the change and provide a representation of the change to the touchscreen processing module 82, which may be a separate processing module or integrated into the processing module 42.

The touchscreen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieved from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the touchscreen display 80. The touchscreen display 80 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the touchscreen display 80, and provides the rendered data to the touchscreen display 80.

Figure 3:
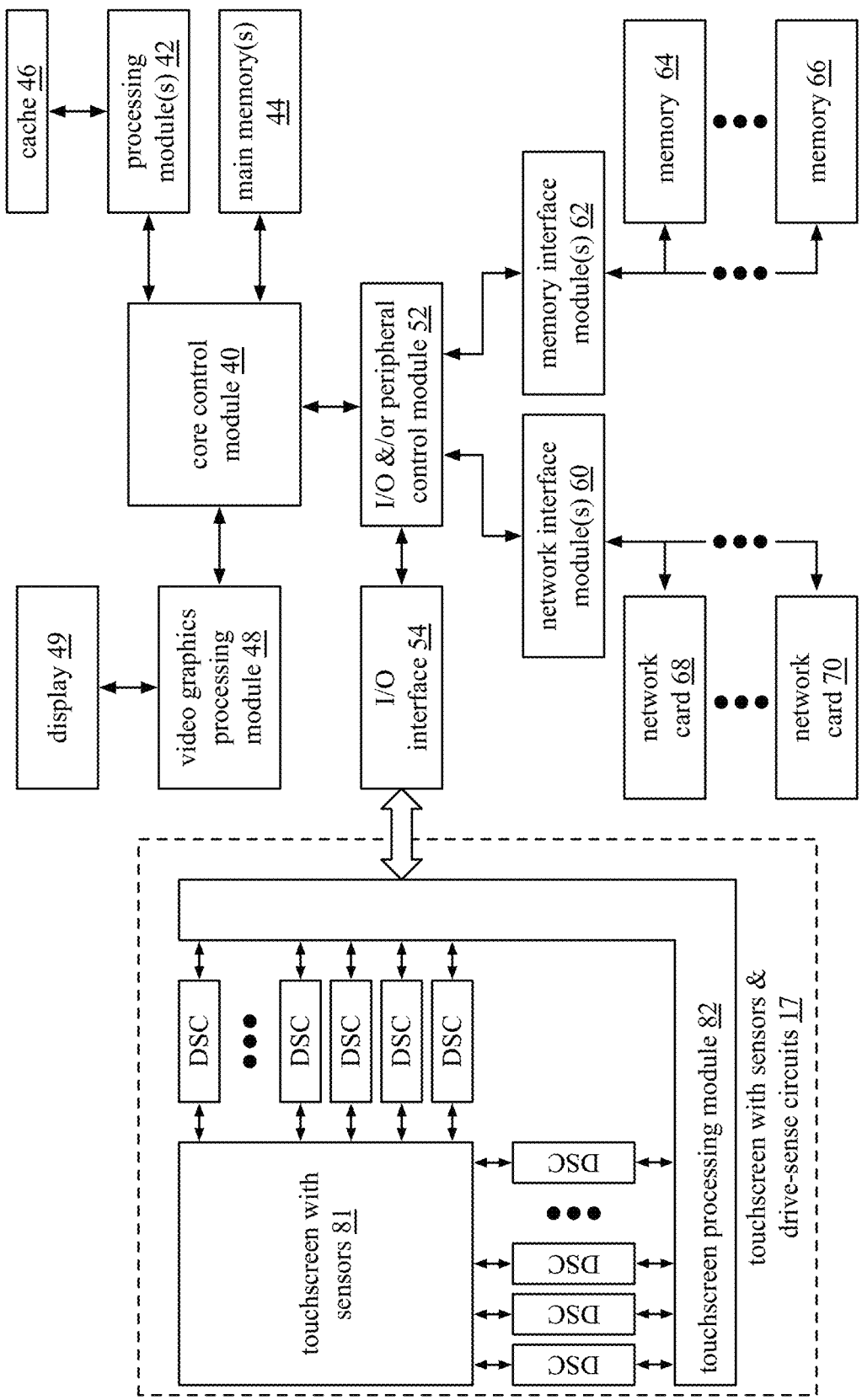
FIG. 3 is a schematic block diagram of another embodiment of a computing device.

FIG. 3 is a schematic block diagram of another embodiment of a computing device 12 that includes a touchscreen with sensors and drive-sense circuits 17 ("touchscreen"), a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, one or more memory interface modules 62, and a display 49.

The touchscreen 17 includes a touchscreen display with sensors 81, a plurality of drive-sense circuits (DSC), and a touchscreen processing module 82. The communication device 12 of FIG. 3 operates similarly to the communication device 12 of FIG. 2 except that the touchscreen with sensors 81 is separate from the display 49.

Figure 4:
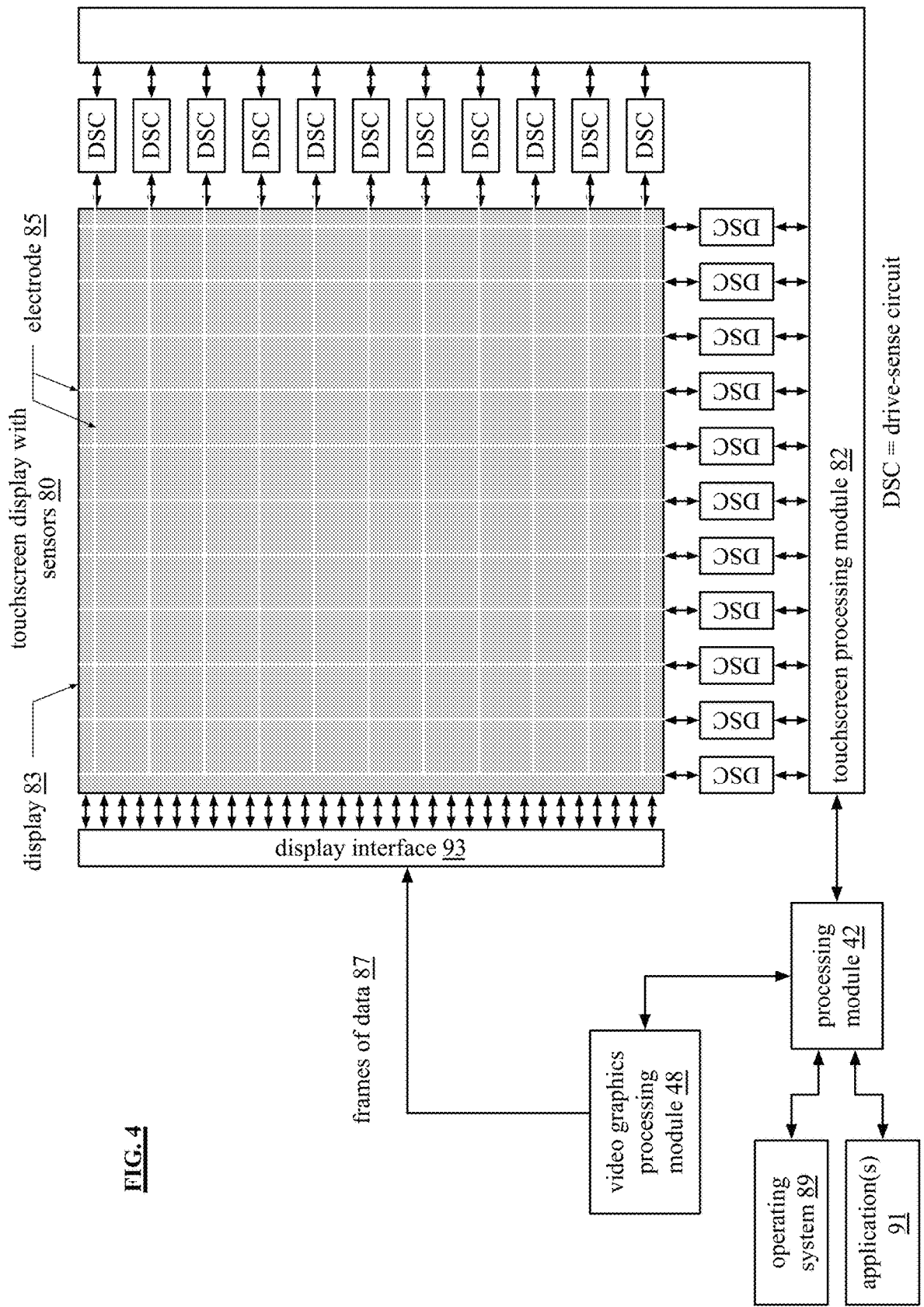
FIG. 4 is a schematic block diagram of another embodiment of a computing device.

FIG. 4 is a schematic block diagram of another embodiment of a computing device 12 that includes a touchscreen display with sensors 80, the drive-sense circuits (DSC), the touchscreen processing module 82, a display 83, electrodes 85, the processing module 42, the video graphics processing module 48, and a display interface 93. The display 83 may be a large screen display (e.g., for portable computing devices) or a large screen display (e.g., for fixed computing devices). In general, a large screen display has a resolution equal to or greater than full high definition (HD), an aspect ratio of a set of aspect ratios, and a screen size equal to or greater than thirty-two inches. The following table lists various combinations of resolution, aspect ratio, and screen size for the display 83, but it's not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->= 7680 | 720->= 4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital micro shutter display (DMS). The display is active in a full display mode or a multiplexed display mode (i.e., only part of the display is active at a time).

The touchscreen 12 includes integrated electrodes 85 that provide the sensors for the touch sense part of the touchscreen display. The electrodes 85 are distributed throughout the display area or where touchscreen functionality is desired. For example, a first group of the electrodes are arranged in rows and a second group of the electrodes are arranged in columns.

The electrodes 85 are comprised of a transparent conductive material and are in-cell or on-cell with respect to layers of the display. For example, a conductive trace is placed in-cell or on-cell of a layer of the touchscreen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched by a pen or device, signals on the electrodes 85 proximal to the touch (i.e., directly or close by) are changed. The DSCs detect the change for effected electrodes and provide the detected change to the touchscreen processing module 82.

The touchscreen processing module 82 processes the change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

If the signals received from the pen or device include embedded data, the touchscreen processing module 82 interprets the embedded data and provides the resulting information to the processing module 42. If, computing device 12 is not equipped to process embedded data, the pen or device still communicates with the computing device using the change to the signals on the effected electrodes (e.g., increase magnitude, decrease magnitude, phase shift, etc.).

Figure 5:
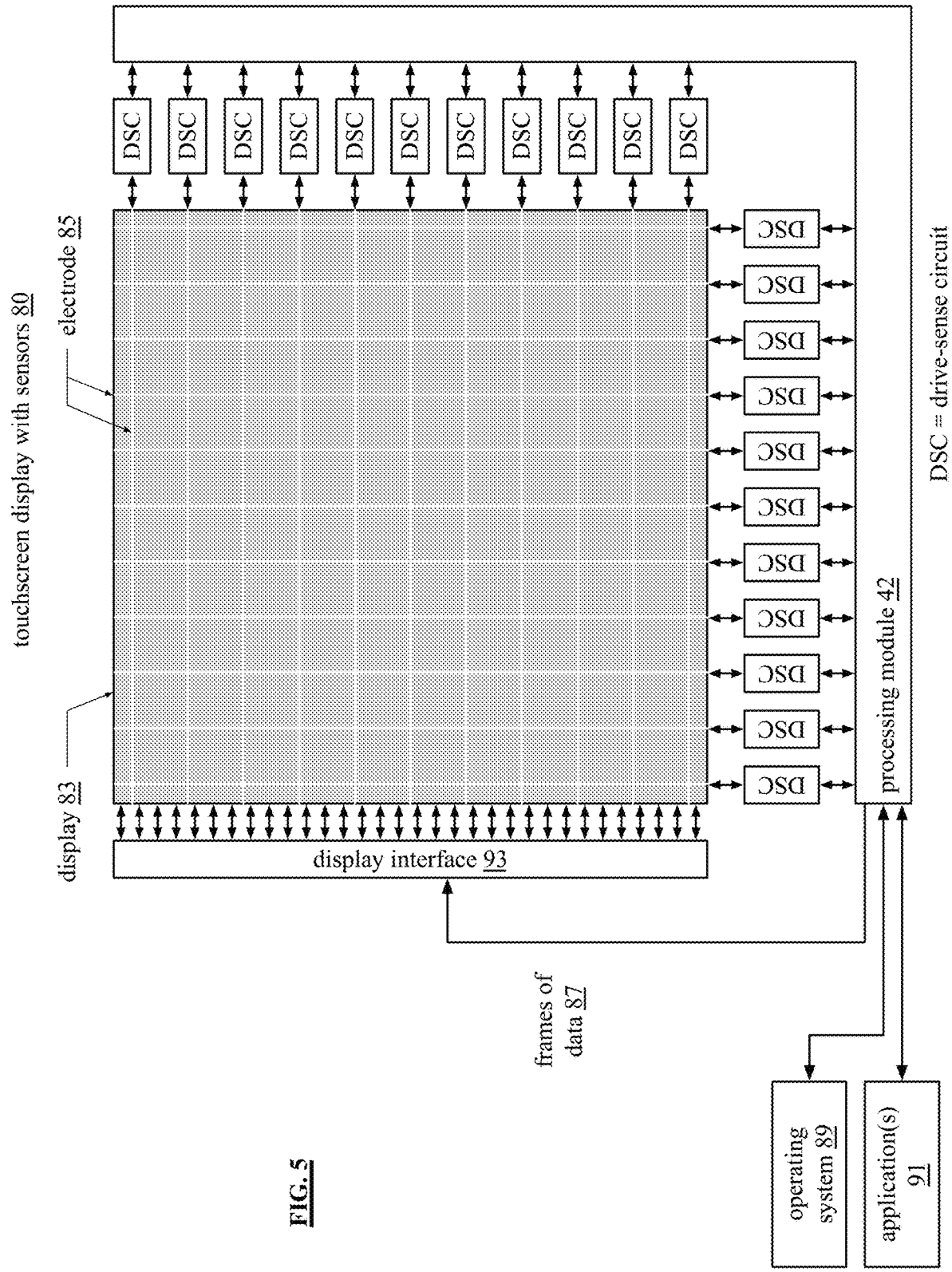
FIG. 5 is a schematic block diagram of another embodiment of a touchscreen display.

FIG. 5 is a schematic block diagram of another embodiment of a touchscreen display 80 that includes a plurality of drive-sense circuits (DSC), the processing module 42, a display 83, and a plurality of electrodes 85. The processing module 42 is executing an operating system 89 and one or more user applications 91 to produce frames of data 87. The processing module 42 provides the frames of data 87 to the display interface 93. The touchscreen display 80 operates similarly to the touchscreen display 80 of FIG. 4 with the above noted differences (e.g., the processing module 42 operates as the touchscreen processing module).

Figure 6:
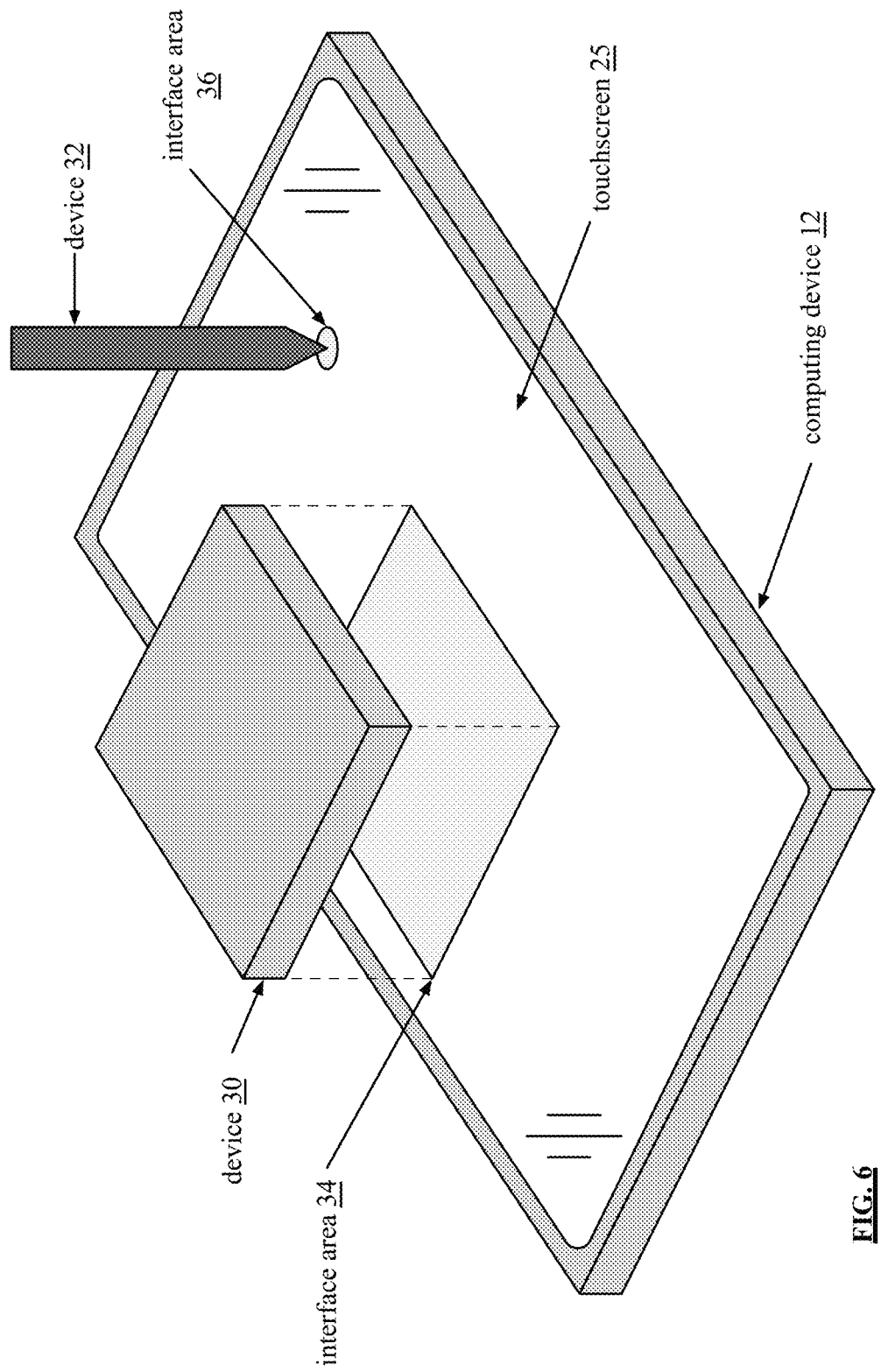
FIG. 6 is a schematic block diagram of an embodiment of a computing device and devices.

FIG. 6 is a schematic block diagram of an embodiment of a computing device 12 and devices 30-32. The computing device 12 includes a touchscreen 25, which may further include a display to form a touchscreen display. The computing device 12 operates similarly to any of the computing devices 12 of FIGS. 2-5. The touchscreen 25 may be the touchscreen of any of FIGS. 2-5. For example, the touchscreen 25 is the touchscreen with sensors and drive-sense circuits 16 of FIG. 2.

The devices 30-32 interact with the touchscreen 25 to communicate data with the computing device 12. For example, the device 30 touches, or nearly touches, the touchscreen 25 at an interface area 34 and the device 32 touches, or nearly touches, the touchscreen 25 at an interface area 36. A traditional passive device (i.e., capacitive pen) is made of a conductive material, contains no battery, and interacts with a touchscreen in the same manner as a user's finger.

When the device 30-32 is a passive device, the touchscreen 25 (i.e., the touchscreen processing module) must first identify that the device 30-32 in close proximity to the touchscreen 25 is an interactive device (e.g., versus a finger, another passive object, a non-interactive object, a palm, etc.). The touchscreen 25 detects, via one or more drive-sense circuits of the touchscreen, changes in electrical characteristics of sensors of the touchscreen 25. The touchscreen 25 determines the interface areas 34-36 based on the location of affected sensors and is operable to associate the interface area 34-36 with a passive (e.g., non-powered) interactive device.

For example, the touchscreen 25 analyzes the size and shape of the interface areas 34-36 in comparison with known interface areas associated with known interactive objects (e.g., a pen). For example, the device 32 is a known interactive object (e.g., a passive pen) (e.g., the touchscreen 25 anticipates interaction with a passive pen and stores information related to passive pen detection). An interface area 36 associated with a passive pen is around the size of a pen tip (e.g., smaller than a finger). An impedance pattern of the interface area is also analyzed in comparison to known impedance patterns associated with the known interactive objects.

For example, an impedance measurement in a certain range in a small pen tip sized area may indicate the passive pen whereas an impedance pattern having various impedance levels (e.g., some sections have higher impedance as compared to others) over a larger area may indicate a palm or a hand. When the size and shape of the interface area is a substantial match with the size and shape of the known interface area of the passive pen and the impedance pattern is indicative of the passive pen, the touchscreen associates the interface area 36 with the passive pen 32 (e.g., the shape and size of the interface area 36 is relatively small like a pen tip and the impedance pattern includes a measurement indicative of passive pen tip contact).

Presence of a conductive or dielectric material alone near the touchscreen 25 causes a small mutual capacitance change of sensors within the interface areas 34-36 of the touchscreen 25 (e.g., dielectric materials generally increase mutual capacitance whereas conductive materials generally decrease mutual capacitance) that is detectable by one or more of the highly sensitive drive-sense circuits. When a user touches a conductive device, and the device is in close proximity to the touchscreen's surface, the capacitance of the human body coupled to the device causes a self capacitance and a mutual capacitance change of sensors (e.g., electrodes) of the interface area 34-36 of the touchscreen 25 that is detectable by one or more drive-sense circuits of the touchscreen. Mutual and self capacitance information can be used to convey different information (e.g., a mutual capacitance change without a self capacitance change along with the size of the interface area may indicate the presence of a passive pen that is not in use, a mutual and self capacitance change indicates a touch, etc.).

In another advanced and novel mode, a passive device may include a pressure sensor assembly for detecting pressure changes in a z-direction. In traditional passive pens, XY location of a passive pen on a touchscreen can be determined, but the localized Z-pressure applied on a passive pen tip will make an enlarged contact spot due to deflection of the tip. The deflection can be interpreted as relative pressure and not an absolute measurement. In traditional active pens, absolute pressure measurements are interpreted by an onboard calculation that will retransmit the pressure value to a touch sensor.

When a passive device includes a pressure assembly (as described in more detail with reference to FIG. 21-23) having a compressive property (e.g., a compressive material, a compressible shape, etc.) for pressure sensing, as a user applies pressure to a tip of the passive pen on the touchscreen, the pressure assembly is compressed. Compression of the pressure assembly creates a capacitance change (e.g., capacitance of the pen increases with compression) that affects electrical characteristics of sensors of the touchscreen within the interface area 34-36. Based on the change in electrical characteristics of the sensors and the knowledge that the object is a passive device, the touchscreen processing module interprets the change in electrical characteristics of the sensors as impedance values. When the impedance values are within a first range, the touchscreen processing module interprets the impedance values as a touch. When the impedance values are within a second range, the touchscreen processing module interprets the impedance values as a pressure measurement where the second range is lower (i.e., the capacitance is higher) than the first range. The pressure measurement determined is an absolute measurement.

In an example, measurement of the z pressure is decoded by the touchscreen processing module as a scaled percentage of the difference between the minimum and maximum energy values from a touch on the touchscreen 25. As a specific example, if a touch is represented by a value in the range between 0 to 255 (8-bit binary value) when the touchscreen processing module is calibrated, with the minimum (0 or 0%) and maximum (255 or 100%) signal values, a pressure value is reported as a dynamic value within that range.

When the impedance values are within a third range, the touchscreen processing module interprets the impedance values as a hover where the third range is higher (i.e., the capacitance is lower) than the first range. The touchscreen processing module is operable to attribute the pressure measurement, touch, and/or hover and/or various actions as various inputs (e.g., when the pen capacitance is at a higher end of a pressure range, a user is pressing the pen to indicate a darker stroke, when the capacitance is within the touch range and a double tap occurs, the user is performing a selection function, etc.).

While the example of FIG. 6 shows devices 30-32 interacting with the touchscreen 25, multiple other devices and/or fingers may simultaneously interact with the touchscreen 25. For example, while device 32 is interacting with the touchscreen, a finger touches the touchscreen 25 in a different area to convey different information to the computing device 12.

The device 30 interacts with the touchscreen 25 in a similar manner as the device 32 (e.g., a pen), but may include more touch points to provide additional information. For example, the device 30 is a mouse, a ruler, a game piece (e.g., a puck), an educational piece for communicating data with an interactive desktop, an interactive tabletop, and/or an interactive white board. As another example, the device 30 is a cell phone case for facilitating communication between a cell phone and an interactive desktop, an interactive tabletop, and/or an interactive white board. As yet another example, the device 30 is circuitry included in cell phones to enable touchscreen to touchscreen communication.

Figure 7:
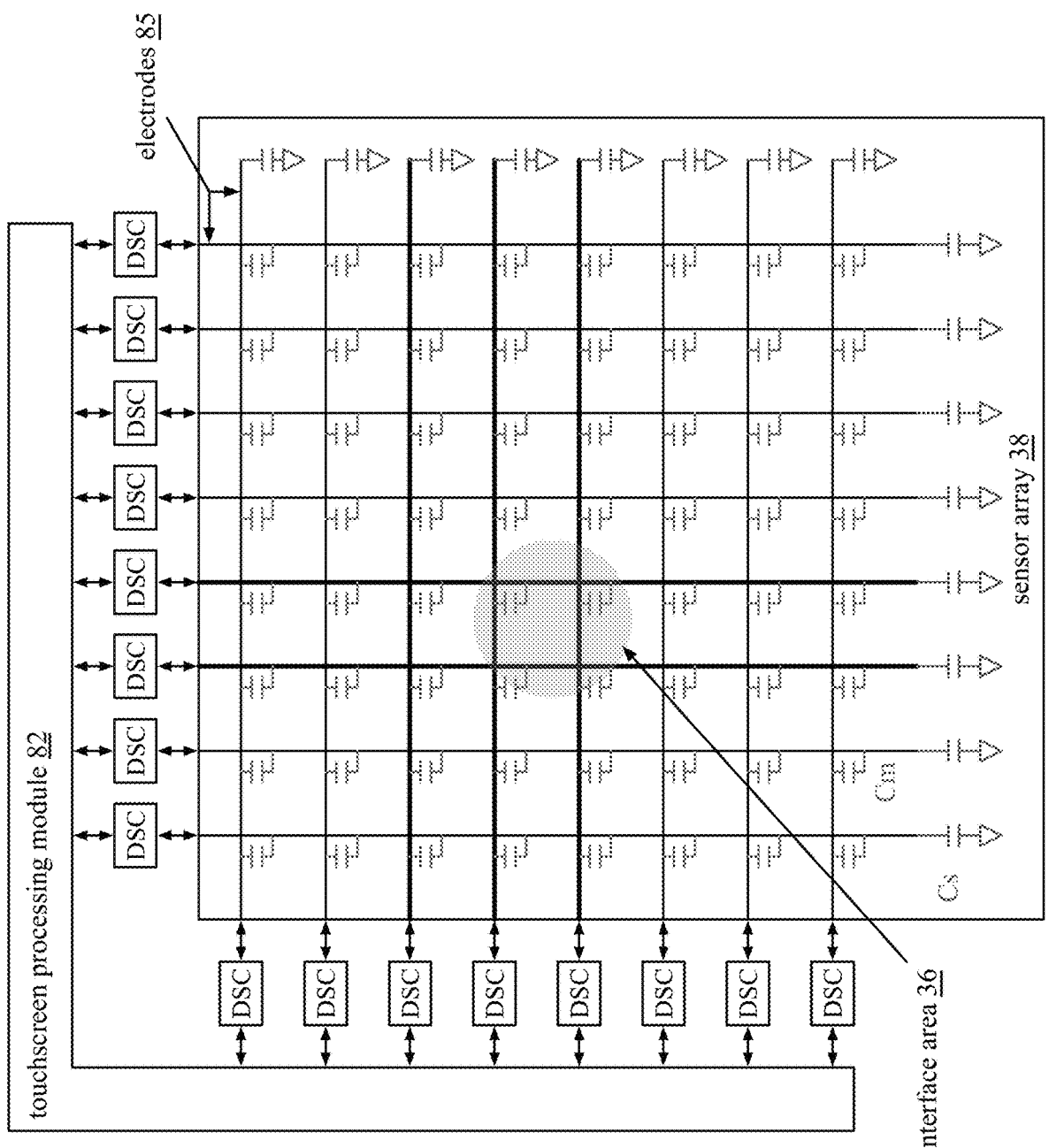
FIG. 7 is a schematic block diagram of an embodiment of a touchscreen.

FIG. 7 is a schematic block diagram of an embodiment of a touchscreen 25 (e.g., touchscreen with sensors and drive-sense circuits (DSC) 16 of FIG. 2) that includes a plurality of drive-sense circuits (DSC), a sensor array 38, and a touchscreen processing module 82. The touchscreen 25 may further include a display making it a touchscreen display. The touchscreen 25 may be part of an interactive display, or other device that includes a touchscreen display. An interactive display functions to provide users with an interactive experience (e.g., touch the screen to obtain information, be entertained, etc.).

The sensor array 38 includes a plurality of integrated electrodes 85 that provide the sensors for the touch sense part of the touchscreen 25. The electrodes 85 are distributed throughout a display area or where touch sense functionality is desired. For example, a first group of the electrodes are arranged in rows and a second group of electrodes are arranged in columns. For example, the row electrodes are separated from the column electrodes by a dielectric material.

Each electrode 85 has a self-capacitance (Cs) (shown in red), which corresponds to a parasitic capacitance created by the electrode with respect to other conductors in the display (e.g., ground, conductive layer(s), and/or one or more other electrodes). Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance. In addition to self-capacitance, a mutual capacitance (Cm) (shown in blue) exists between a row and column electrode.

In an example of operation, the touchscreen 25 receives frames of video (e.g., frames of a video file, refresh rate for a word processing document, a series of images, etc.) from a processing module (e.g., the video graphics processing module 48 of FIGS. 2-4). The touchscreen 25 renders the frames of video into visible images.

While the touchscreen 25 is rendering the frames of video into visible images, the drive-sense circuits (DSC) provide sensor signals to the electrodes 85. When a touch or hover is in proximity to the touchscreen 25, capacitance of the electrodes 85 in an interface area 36 of the touch and/or hover is changed. In essence, a finger touch creates a parallel capacitance with the parasitic self-capacitances. For example, during a touch, the self-capacitance of an electrode 85 is $C_s$ (self capacitance)+$C_{f1}$ (finger capacitance). As such, a touch increases the self-capacitance of the affected electrodes, which decreases the impedance for a given frequency (based on $\frac{1}{2\pi fC}$).

A finger capacitance is effectively in series with the mutual capacitance (Cm), which decreases capacitance of the mutual capacitance. As such, a touch decreases the mutual capacitance of the affected electrodes, which increases the impedance for a given frequency (based on based on $\frac{1}{2\pi fC}$).

The electrical field of the self and mutual capacitances of electrodes extends beyond the surface of the touchscreen. A hover therefore affects the electrical field and causes capacitive coupling from a finger or device to the touchscreen. This capacitive coupling is detectable by the touchscreen and based on the level of capacitance change, can be distinguished from a touch.

The DSCs detect the changes in impedance of the self-capacitance and mutual capacitance and provide the detected changes to the touchscreen processing module 82. The touchscreen processing module 82 processes the capacitance changes of the affected electrodes to determine one or more specific locations of interaction (e.g., the interface area 36).

The touchscreen processing module 82 determines whether the changes are attributable to a particular device by analyzing the interface area and impedance pattern of the interface area. For example, the touchscreen processing module 82 analyzes the size and shape of the interface area in comparison with known interface areas associated with known interactive objects (e.g., a pen). For example, an interface area associated with a passive pen is around the size of a pen tip (e.g., smaller than a finger).

An impedance pattern of the interface area is also analyzed in comparison to known impedance patterns associated with the known interactive objects. For example, an impedance measurement in a certain range in a small pen tip sized area may indicate a passive pen whereas an impedance pattern having various impedance levels (e.g., some sections have higher impedance as compared to others) over a larger area may indicate a palm or a hand. When the size and shape of the interface area is a substantial match with the size and shape of the known interface area of a passive device (e.g., a pen) and the impedance pattern is indicative of the passive device, the touchscreen associates the interface area with the passive device (e.g., the shape and size of the interface area are relatively small like a pen tip and the impedance pattern includes a measurement indicative of passive pen tip contact).

Presence of a conductive or dielectric material alone near the touchscreen causes a small mutual capacitance change of electrode(s) within the interface area 36 of the touchscreen 25 (e.g., dielectric materials generally increase mutual capacitance whereas conductive materials generally decrease mutual capacitance) that is detectable by one or more of the highly sensitive drive-sense circuits. When a user touches a conductive pen, the capacitance of the human body coupled to the pen causes a self capacitance and a mutual capacitance change of sensors (e.g., electrodes) of the interface area 36 of the touchscreen 25 that is detectable by one or more drive-sense circuits of the touchscreen. Mutual and self capacitance information can be used to convey different information (e.g., a mutual capacitance change without a self capacitance change along with the size of the interface area may indicate the presence of a device that is not in use, a mutual and self capacitance change indicates a touch, etc.).

The touchscreen processing module 82 may provide information to another processing module (e.g., processing module 42 of FIGS. 2-5). For example, the processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 8:
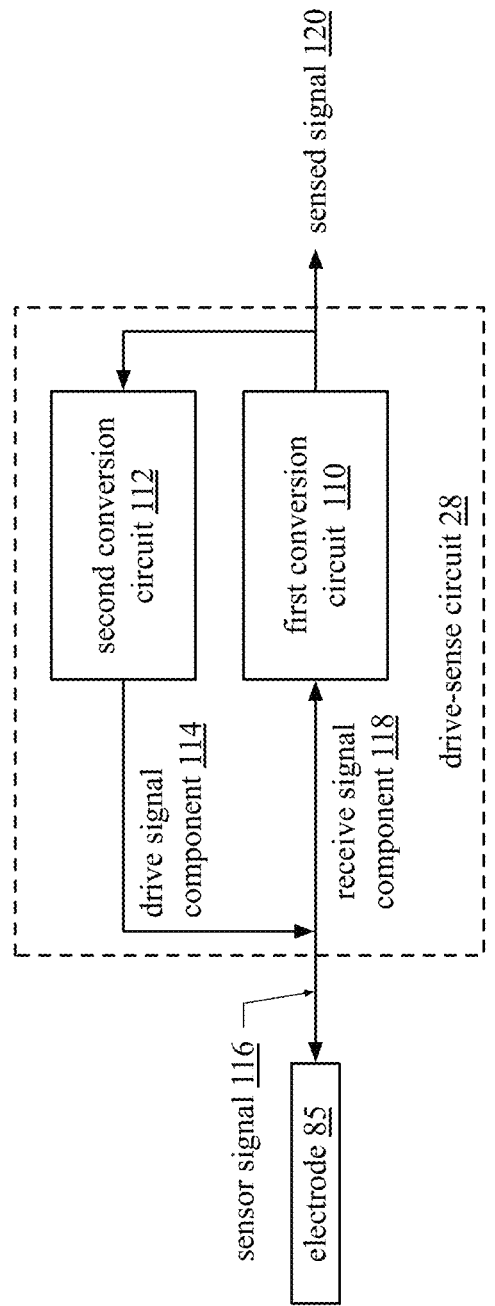
FIG. 8 is a schematic block diagram of an embodiment of a drive-sense circuit.

FIG. 8 is a schematic block diagram of an embodiment of a drive-sense circuit 28 that includes a first conversion circuit 110 and a second conversion circuit 112. The first conversion circuit 110 converts a sensor signal 116 into a sensed signal 120. The second conversion circuit 112 generates the drive signal component 114 from the sensed signal 112. As an example, the first conversion circuit 110 functions to keep the sensor signal 116 substantially constant (e.g., substantially matching a reference signal) by creating the sensed signal 120 to correspond to changes in a receive signal component 118 of the sensor signal. The second conversion circuit 112 functions to generate a drive signal component 114 of the sensor signal based on the sensed signal 120 to substantially compensate for changes in the receive signal component 118 such that the sensor signal 116 remains substantially constant.

In an example, the drive signal 116 is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 110 adjusts the sensed signal 120 based on the receive signal component 118, which is indicative of the impedance of the electrode and change thereof. The second conversion circuit 112 adjusts the regulated current based on the changes to the sensed signal 120.

As another example, the drive signal 116 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 110 adjusts the sensed signal 120 based on the receive signal component 118, which is indicative of the impedance of the electrode and change thereof. The second conversion circuit 112 adjusts the regulated voltage based on the changes to the sensed signal 120.

Figure 9:
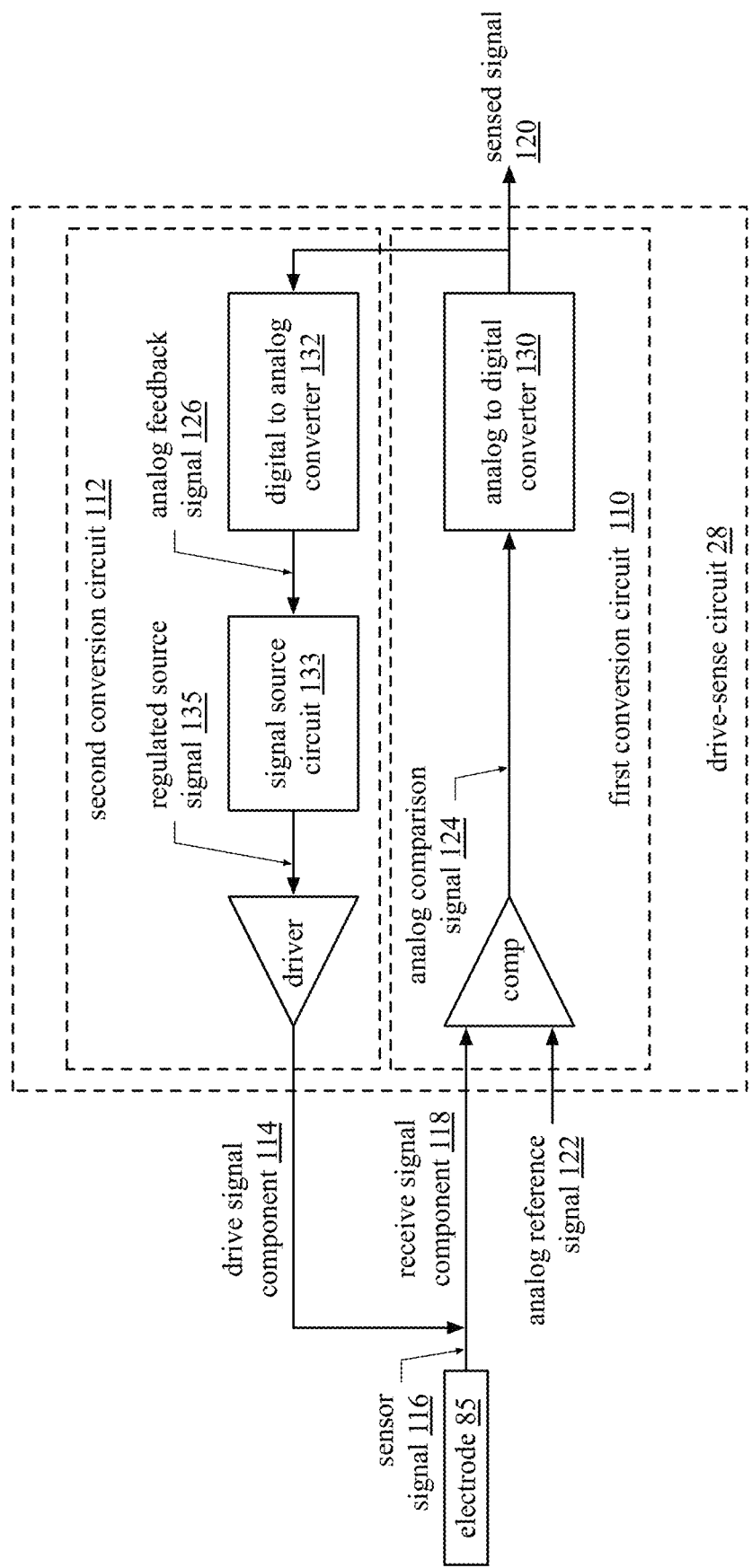
FIG. 9 is a schematic block diagram of another embodiment of a drive-sense circuit.

FIG. 9 is a schematic block diagram of another embodiment of a drive-sense circuit 28 that includes a first conversion circuit 110 and a second conversion circuit 112. The first conversion circuit 110 includes a comparator (comp) and an analog to digital converter 130. The second conversion circuit 112 includes a digital to analog converter 132, a signal source circuit 133, and a driver.

In an example of operation, the comparator compares the sensor signal 116 to an analog reference signal 122 to produce an analog comparison signal 124. The analog reference signal 124 includes a DC component and an oscillating component. As such, the sensor signal 116 will have a substantially matching DC component and oscillating component. An example of an analog reference signal 122 will be described in greater detail with reference to FIG. 14.

The analog to digital converter 130 converts the analog comparison signal 124 into the sensed signal 120. The analog to digital converter (ADC) 130 may be implemented in a variety of ways. For example, the (ADC) 130 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114.

Figure 10A:
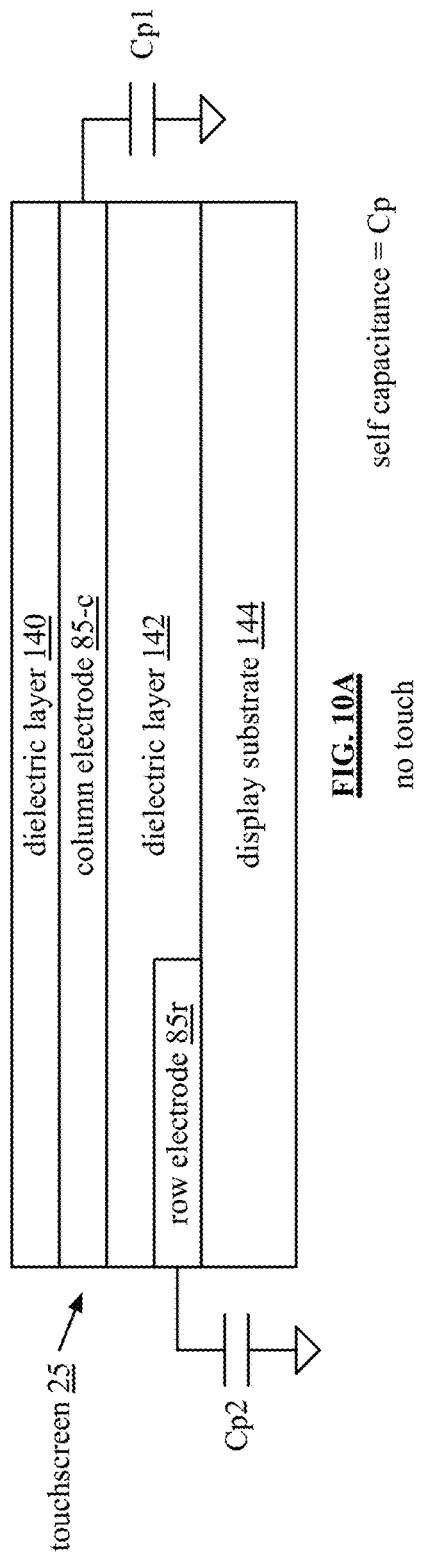
FIG. 10A is a cross section schematic block diagram of an embodiment of a touchscreen.

FIG. 10A is a cross section schematic block diagram of an embodiment of a touchscreen 25 without a touch of a finger or a device. The cross section is taken parallel to a column electrode 85-c and perpendicular to a row electrode 85-r. The column electrode 85-c is positioned between two dielectric layers 140 and 142. Alternatively, the column electrode 85-c is in the second dielectric layer 142. The row electrode 85-r is positioned in the second dielectric layer 142. Alternatively, the row electrode 85-r is positioned between the dielectric layer 142 and the display substrate 144. As another alternative, the row and column electrodes are in the same layer.

Each electrode 85 has a self-capacitance, which corresponds to a parasitic capacitance created by the electrode with respect to other conductors in the display (e.g., ground, conductive layer(s), and/or one or more other electrodes). For example, row electrode 85-r has a parasitic capacitance $C_{p2}$ and column electrode 85-c has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the touchscreen 25 includes a plurality of layers 140-144. Each illustrated layer may itself include one or more layers. For example, dielectric layer 140 includes a surface protective film, a glass protective film, and/or one or more pressure sensitive adhesive (PSA) layers. As another example, the second dielectric layer 142 includes a glass cover, a polyester (PET) film, a support plate (glass or plastic) to support, or embed, one or more of the electrodes 85-c and 85-r, a base plate (glass, plastic, or PET), and one or more PSA layers. As yet another example, the display substrate 144 includes one or more LCD layers, a back-light layer, one or more reflector layers, one or more polarizing layers, and/or one or more PSA layers.

Figure 10B:
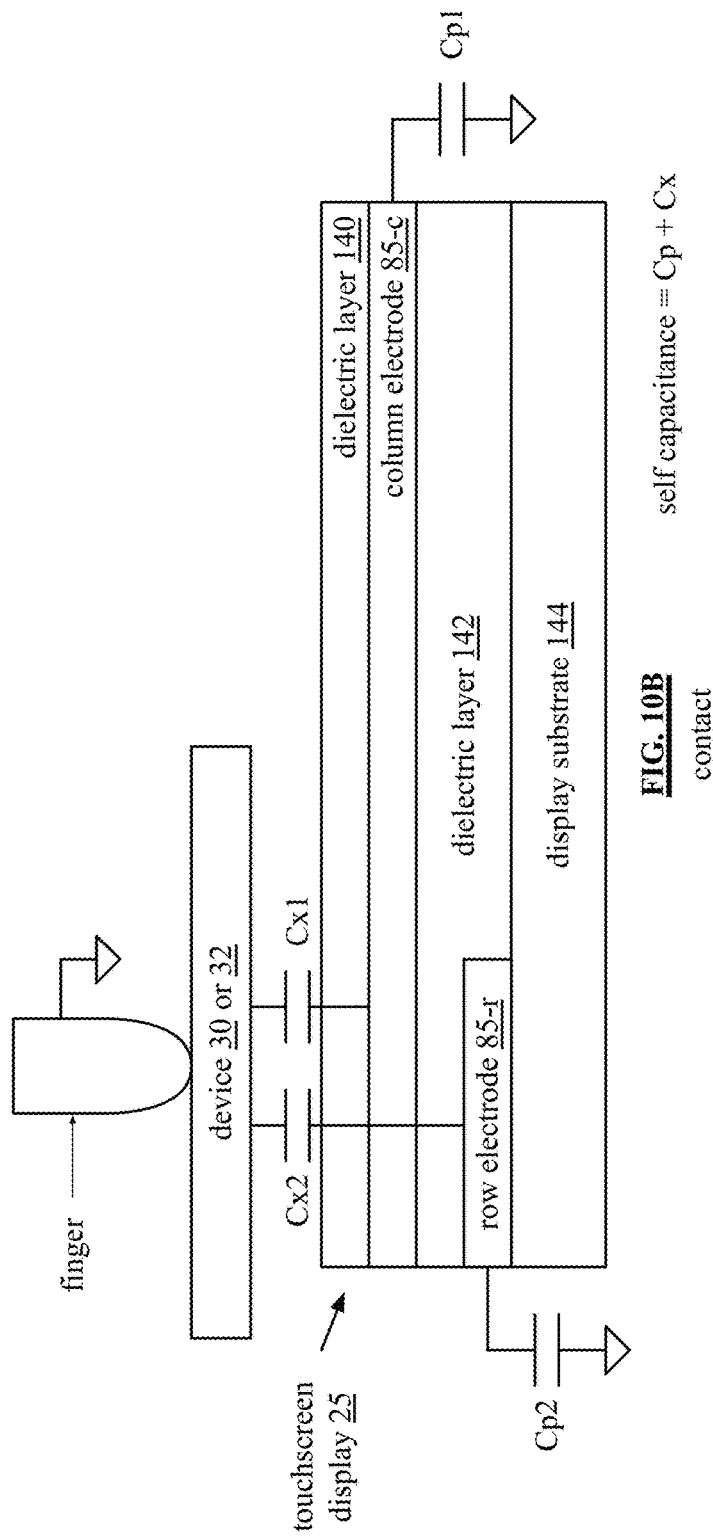
FIG. 10B is a cross section schematic block diagram of an embodiment of a touchscreen.

FIG. 10B is a cross section schematic block diagram of an embodiment of a touchscreen 25, which is the same as in FIG. 10A. This figure further includes the device 30 or 32 capacitively coupled to the row and column electrodes proximal to the touch. When the device 30 or 32 is touched by a person and is touching the touchscreen, the person provides a path to ground such that the device 30 or 32 affects both the mutual capacitance and the self-capacitance. When the device 30 or 32 is not touched by a person, there is no path to ground and thus the device 30 or 32 only effects the mutual capacitance.

In essence, the touch of device 30 or 32 with the path to ground creates a parallel capacitance with the parasitic self-capacitances. For example, the self-capacitance of the column electrode 85-c is $C_{p1}$ (parasitic capacitance)+$C_{x1}$ (device capacitance) and the self-capacitance of the row electrode 85-r is $C_{p2}+C_{x2}$. As such, the device capacitance increases the self-capacitance of the electrodes, which decreases the impedance for a given frequency. The change in impedance of the self-capacitance is detectable by a corresponding drive-sense circuit and is subsequently processed to indicate a screen touch.

FIG. 11A is a cross section schematic block diagram of an embodiment of a touchscreen 25, which is the same as in FIG. 10A. This figure further includes a mutual capacitance ($C_{m\_0}$) between the electrodes when a touch is not present.

FIG. 11B is a cross section schematic block diagram of an embodiment of a touchscreen 25, which is the same as in FIG. 10A. This figure further includes a mutual capacitance ($C_{m\_1}$) between the electrodes when contact by a device 30 or 32 is present. In this example, the device 30 or 32 capacitance is effectively in series with the mutual capacitance, which decreasing capacitance of the mutual capacitance. As the capacitance decreases for a given frequency, the impedance increases. The change in impedance of the mutual capacitance is detectable by a corresponding drive-sense circuit and is subsequently processed to indicate a screen touch. Note that, depending on the various properties (e.g., thicknesses, dielectric constants, electrode sizes, electrode spacing, etc.) of the touchscreen display, the parasitic capacitances, the mutual capacitances, and/or the finger capacitance are in the range of a few pico-Farads to tens of nano-Farads. In equation form, the capacitance (C) equals:

$$C = \epsilon \frac{A}{d}$$

where A is plate area, ϵ is the dielectric constant(s), and d is the distance between the plates.

FIG. 12 is an example graph that plots condition verses capacitance for an electrode of a touchscreen. As shown, the mutual capacitance decreases with a touch and the self-capacitance increases with a touch. Note that the mutual capacitance and self-capacitance for a no-touch condition are shown to be about the same. This is done merely for ease of illustration. In practice, the mutual capacitance and self-capacitance may or may not be about the same capacitance based on the various properties of the touchscreen display discussed above.

FIG. 13 is an example graph that plots impedance verses frequency for an electrode of a touchscreen. Since the impedance of an electrode is primarily based on its capacitance (self and/or mutual), as the frequency increases for a fixed capacitance, the impedance decreases based on ½πfC, where f is the frequency and C is the capacitance.

FIG. 14 is a time domain example graph that plots magnitude verses time for an analog reference signal 122. As discussed with reference to FIG. 9, the analog reference signal 122 (e.g., a current signal or a voltage signal) is inputted to a comparator and is compared to the sensor signal 116. The feedback loop of the drive-sense circuit 28 functions to keep the sensor signal 116 substantially matching the analog reference signal 122. As such, the sensor signal 116 will have a similar waveform to that of the analog reference signal 122.

In an example, the analog reference signal 122 includes a DC component 121 and/or one or more oscillating components 123. The DC component 121 is a DC voltage in the range of a few hundred milli-volts to tens of volts or more. The oscillating component 123 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 123 may vary so that it can be tuned to the impedance of the sensor and/or to be offset in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

FIG. 15 is a frequency domain example graph that plots magnitude verses frequency for an analog reference signal 122. As shown, the analog reference signal 122 includes the DC component 121 at DC (e.g., 0 Hz or near 0 Hz), a first oscillating component 123-1 at a first frequency ($f_1$), and a second oscillating component 123-2 at a second frequency ($f_2$). In an example, the DC component is used to measure resistance of an electrode (if desired), the first oscillating component 123-1 is used to measure the impedance of self capacitance, and the second oscillating component 123-2 is used to measure the impedance of mutual capacitance. Note that the second frequency may be greater than the first frequency.

Figure 16:
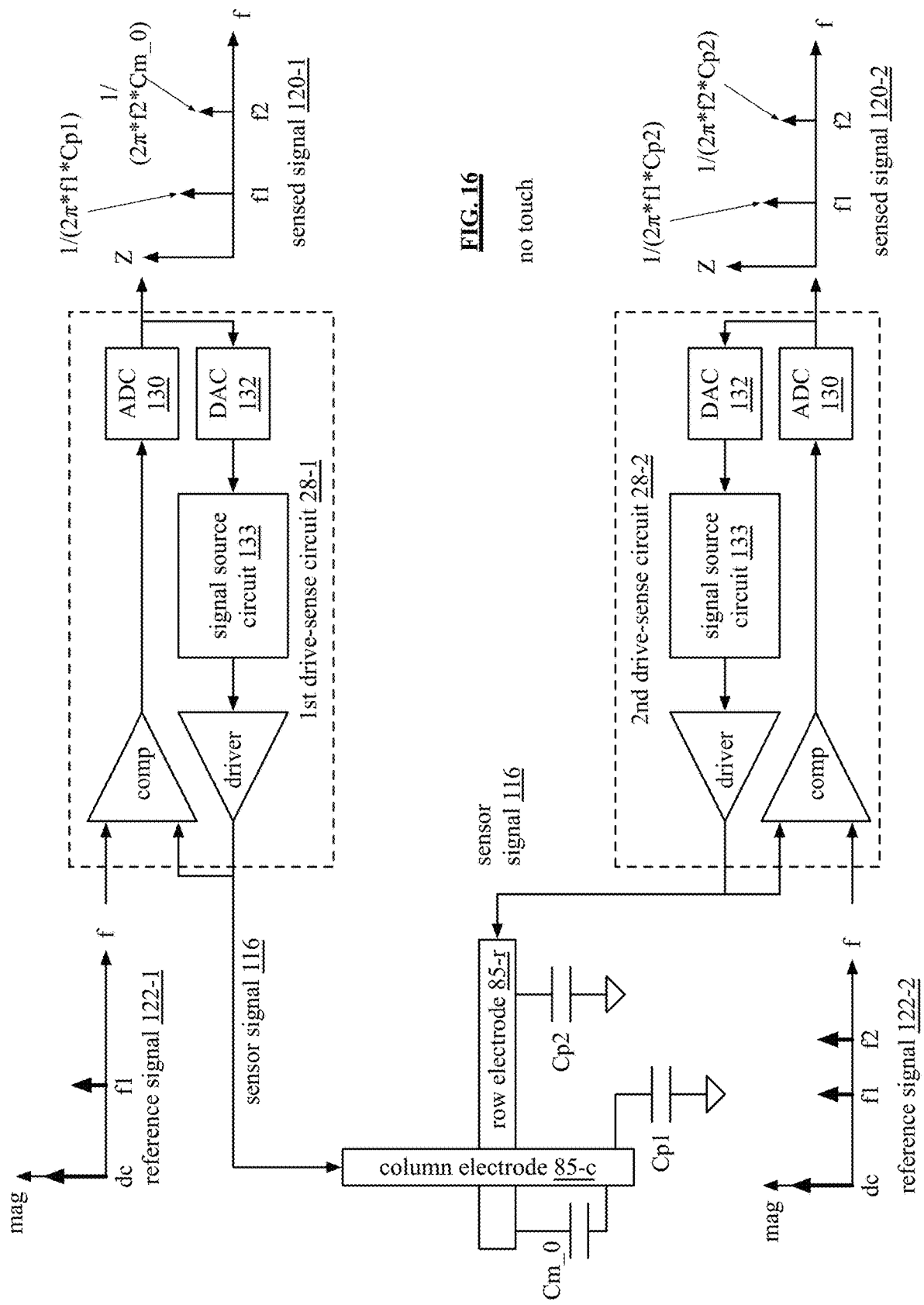
FIG. 16 is a schematic block diagram of an example of a first drive sense circuit coupled to a first electrode and a second drive sense circuit coupled to a second electrode.

FIG. 16 is a schematic block diagram of an example of a first drive sense circuit 28-1 coupled to a first electrode 85-c and a second drive sense circuit 28-2 coupled to a second electrode 85-r without a touch proximal to the electrodes. Each of the drive-sense circuits include a comparator, an analog to digital converter (ADC) 130, a digital to analog converter (DAC) 132, a signal source circuit 133, and a driver. The functionality of this embodiment of a drive-sense circuit was described with reference to FIG. 9. For additional embodiments of a drive-sense circuit see U.S. Pat. No. 11,099,032 entitled, "Drive Sense Circuit with Drive-Sense Line" having a filing date of Aug. 27, 2018, and an application number of Ser. No. 16/113,379.

As an example, a first reference signal 122-1 (e.g., analog or digital) is provided to the first drive-sense circuit 28-1 and a second reference signal 122-2 (e.g., analog or digital) is provided to the second drive-sense circuit 28-2. The first reference signal includes a DC component and/or an oscillating at frequency $f_1$. The second reference signal includes a DC component and/or two oscillating components: the first at frequency $f_1$ and the second at frequency $f_2$.

The first drive-sense circuit 28-1 generates a sensor signal 116 based on the reference signal 122-1 and provides the sensor signal to the column electrode 85-c. The second drive-sense circuit generates another sensor signal 116 based on the reference signal 122-2 and provides the sensor signal to the column electrode.

In response to the sensor signals being applied to the electrodes, the first drive-sense circuit 28-1 generates a first sensed signal 120-1, which includes a component at frequency $f_1$ and a component a frequency $f_2$. The component at frequency $f_1$ corresponds to the self-capacitance of the column electrode 85-c and the component a frequency $f_2$ corresponds to the mutual capacitance between the row and column electrodes 85-c and 85-r. The self-capacitance is expressed as $1/(2\pi f_1 C_{p1})$ and the mutual capacitance is expressed as $1/(2\pi f_2 C_{m\_0})$.

Also, in response to the sensor signals being applied to the electrodes, the second drive-sense circuit 28-1 generates a second sensed signal 120-2, which includes a component at frequency $f_1$ and a component a frequency $f_2$. The component at frequency $f_1$ corresponds to a shielded self-capacitance of the row electrode 85-r and the component a frequency $f_2$ corresponds to an unshielded self-capacitance of the row electrode 85-r. The shielded self-capacitance of the row electrode is expressed as $1/(2\pi f_1 C_{p2})$ and the unshielded self-capacitance of the row electrode is expressed as $1/(2\pi f_2 C_{p2})$.

With each active drive-sense circuit using the same frequency for self-capacitance (e.g., $f_1$), the row and column electrodes are at the same potential, which substantially eliminates cross-coupling between the electrodes. This provides a shielded (i.e., low noise) self-capacitance measurement for the active drive-sense circuits. In this example, with the second drive-sense circuit transmitting the second frequency component, it has a second frequency component in its sensed signal but is primarily based on the row electrode's self-capacitance with some cross coupling from other electrodes carrying signals at different frequencies. The cross coupling of signals at other frequencies injects unwanted noise into this self-capacitance measurement and hence it is referred to as unshielded.

Figure 17:
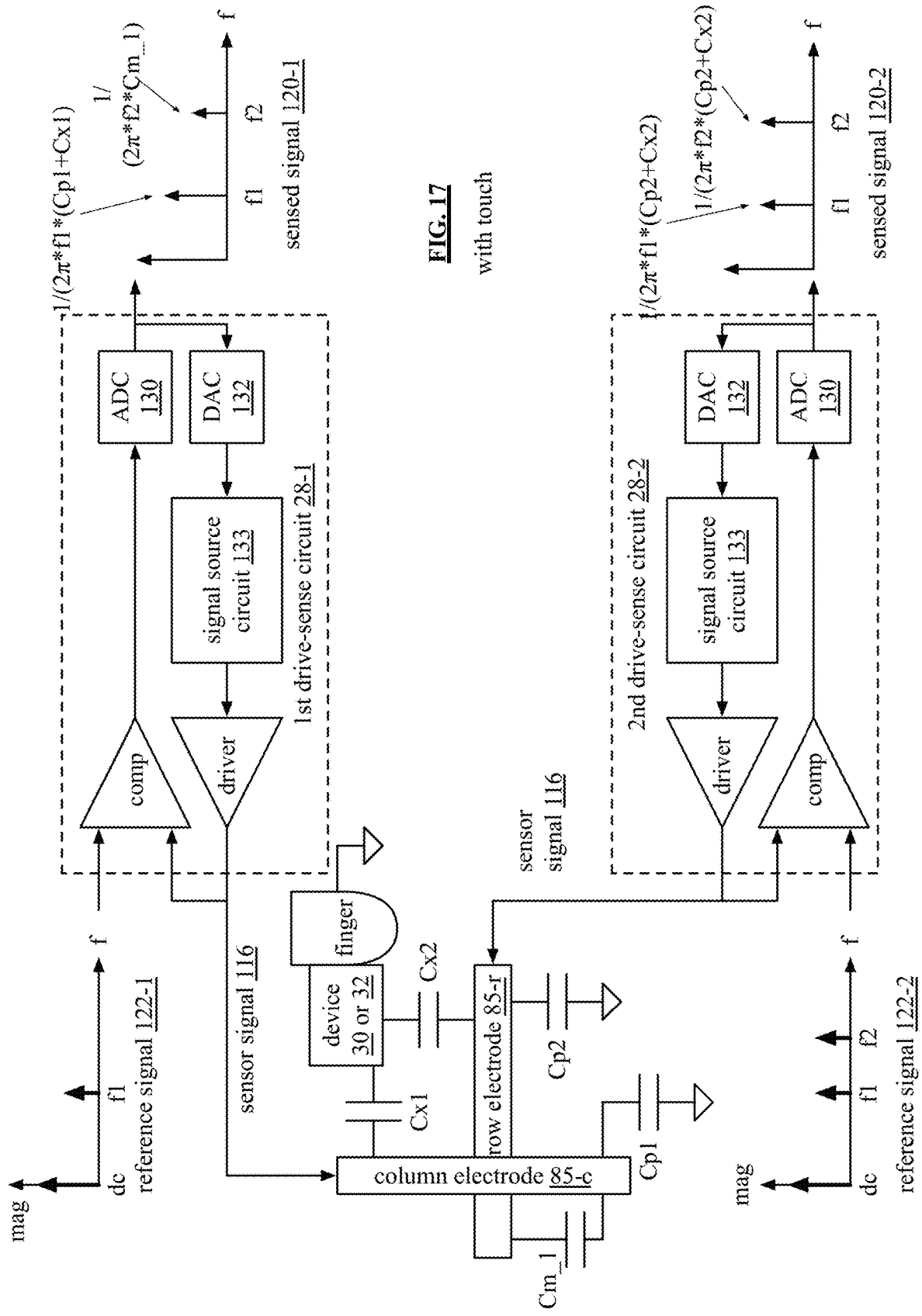
FIG. 17 is a schematic block diagram of an example of a first drive-sense circuit coupled to a first electrode and a second drive-sense circuit coupled to a second electrode.

FIG. 17 is a schematic block diagram of an example of a first drive-sense circuit 28-1 coupled to a first electrode 85-c and a second drive-sense circuit 28-2 coupled to a second electrode 85-$r$ with a grounded device 30 or 32 touch proximal to the electrodes. This example is similar to the one of FIG. 16 with the difference being a touch proximal to the electrodes (e.g., a touch that shadows the intersection of the electrodes or is physically close to the intersection of the electrodes). With the grounded touch, the self-capacitance and the mutual capacitance of the electrodes are changed.

In this example, the impedance of the self-capacitance at $f_1$ of the column electrode 85-$c$ now includes the effect of the device capacitance. As such, the impedance of the self-capacitance of the column electrode equals $1/(2\pi f_1 *(C_{p1}+C_{x1}))$, which is included the sensed signal 120-1. The second frequency component at $f_2$ corresponds to the impedance of the mutual capacitance at $f_2$, which includes the effect of the device capacitance. As such, the impedance of the mutual capacitance equals $1/(2\pi f_2 C_{m\_1})$, where $C_{m\_1}=(C_{m\_0}*C_{x1})/(C_{m\_0}+C_{x1})$.

Continuing with this example, the first frequency component at $f_1$ of the second sensed signal 120-2 corresponds to the impedance of the shielded self-capacitance of the row electrode 85-$r$ at $f_1$, which is affected by the device capacitance. As such, the impedance of the capacitance of the row electrode 85-$r$ equals $1/(2\pi f_1 *(C_{p2}+C_{x2}))$. The second frequency component at $f_2$ of the second sensed signal 120-2 corresponds to the impedance of the unshielded self-capacitance at $f_2$, which includes the effect of the device capacitance and is equal to $1/(2\pi f_2 *(C_{p2}+C_{x2}))$.

Figure 18:
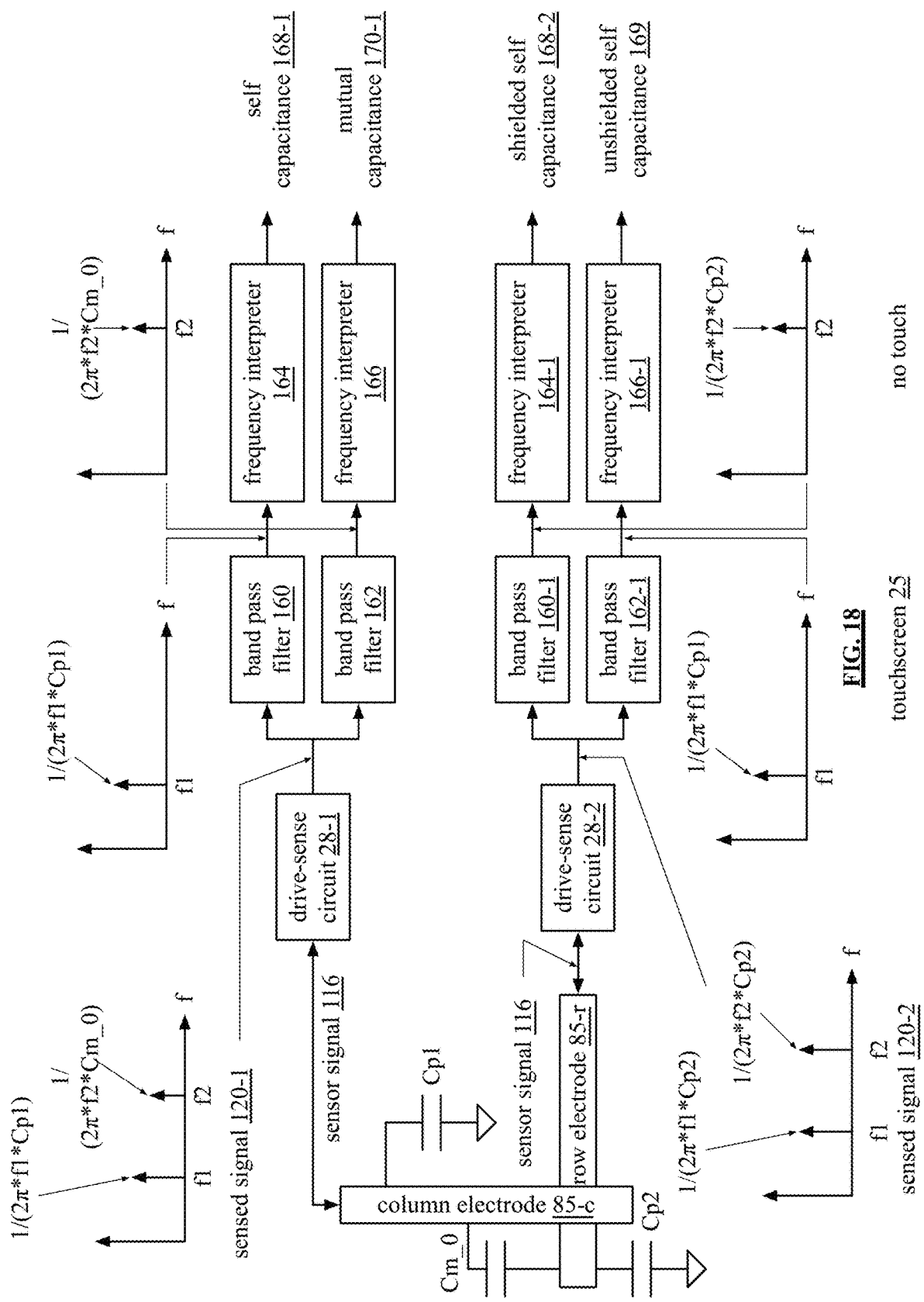
FIG. 18 is a schematic block diagram of a touchless example of a few drive-sense circuits and a portion of the touchscreen processing module of a touchscreen.

FIG. 18 is a schematic block diagram of a touchless example of a few drive-sense circuits 28 and a portion of the touchscreen processing module 82 of a touchscreen 25. The portion of the touchscreen processing module 82 includes band pass filters 160, 162, 160-1, & 160-2 and frequency interpreters 164 & 164-1, and 166 & 166-1. As previously discussed, a first drive-sense circuit 28-1 is coupled to column electrode 85$c$ and a second drive-sense circuit 28-2 is coupled to a row electrode 85$r$.

The drive-sense circuits provide sensor signals 116 to their respective electrodes 85 and produce therefrom respective sensed signals 120. The first sensed signal 120-1 includes a first frequency component at $f_1$ that corresponds to the self capacitance of the column electrode 85$c$ and a second frequency component at $f_2$ that corresponds to the mutual capacitance of the column electrode 85$c$. The second sensed signal 120-2 includes a first frequency component at $f_1$ that corresponds to the shielded self-capacitance of the row electrode 85$r$ and/or a second frequency component at $f_2$ that corresponds to the unshielded self-capacitance of the row electrode 85$r$. In an embodiment, the sensed signals 120 are frequency domain digital signals.

The first bandpass filter 160 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 160 passes the portion of the sensed signal 120-1 that corresponds to the self capacitance of the column electrode 85$c$. In an embodiment, the sensed signal 116 is a digital signal, thus, the first bandpass filter 160 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a self capacitance value 168-1 for the column electrode. As an example, the frequency interpreter 164 is a processing module, or portion thereof, that executes a function to convert the first bandpass filter sensed signal into the self capacitance value 168-1, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The second bandpass filter 162 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 160 passes the portion of the sensed signal 120-1 that corresponds to the mutual capacitance of the column electrode 85$c$ and the row electrode 85$r$. In an embodiment, the sensed signal 116 is a digital signal, thus, the second bandpass filter 162 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 166 receives the second bandpass filter sensed signal and interprets it to render a mutual capacitance value 170-1. As an example, the frequency interpreter 166 is a processing module, or portion thereof, that executes a function to convert the second bandpass filter sensed signal into the mutual capacitance value 170-1, which is an actual capacitance value, a relative capacitance value (e.g., in a range of 0-100), and/or a difference capacitance value (e.g., is the difference between a default capacitance value and a sensed capacitance value). As another example, the frequency interpreter 166 is a look up table where the first bandpass filter sensed signal is an index for the table.

For the row electrode 85$r$, the drive-sense circuit 28-2 produces a second sensed signal 120-2, which includes a shielded self capacitance component and/or an unshielded self capacitance component. The third bandpass filter 160-1 is similar to the first bandpass filter 160 and, as such passes signals in a bandpass region centered about frequency $f_1$ and attenuates signals outside of the bandpass region. In this example, the third bandpass filter 160-1 passes the portion of the second sensed signal 120-2 that corresponds to the shielded self capacitance of the row electrode 85$r$.

The frequency interpreter 164-1 receives the second bandpass filter sensed signal and interprets it to render a second and shielded self capacitance value 168-2 for the row electrode. The frequency interpreter 164-1 may be implemented similarly to the first frequency interpreter 164 or an integrated portion thereof. In an embodiment, the second self capacitance value 168-2 is an actual capacitance value, a relative capacitance value (e.g., in a range of 0-100), or a difference capacitance value (e.g., is the difference between a default capacitance value and a sensed capacitance value).

The fourth bandpass filter 162-2, if included, is similar to the second bandpass filter 162. As such, it passes, substantially unattenuated, signals in a bandpass region centered about frequency $f_2$ and attenuates signals outside of the bandpass region. In this example, the fourth bandpass filter 162-2 passes the portion of the second sensed signal 120-2 that corresponds to the unshielded self capacitance of the row electrode 85$r$.

The frequency interpreter 166-1, if included, receives the fourth bandpass filter sensed signal and interprets it to render an unshielded self capacitance value 168-2. The frequency interpreter 166-1 may be implemented similarly to the first frequency interpreter 166 or an integrated portion thereof. In an embodiment, the unshielded self capacitance value 170-2 is an actual capacitance value, a relative capacitance value (e.g., in a range of 0-100), or a difference capacitance value (e.g., is the difference between a default capacitance value and a sensed capacitance value). Note that the unshielded self capacitance may be ignored, thus band pass filter 162-1 and frequency interpreter 166-1 may be omitted.

Figure 19:
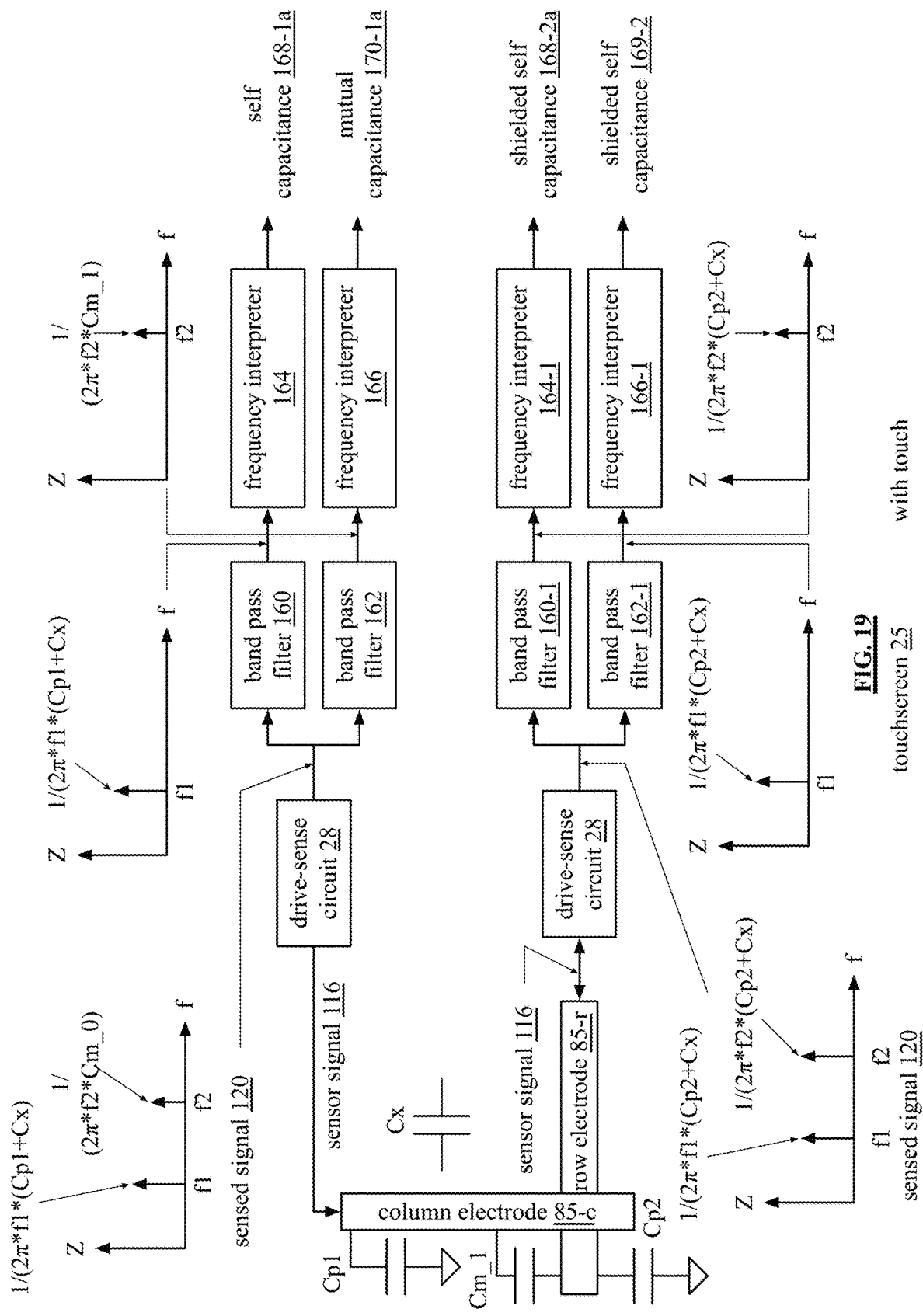
FIG. 19 is a schematic block diagram of a grounded device touch example of a few drive-sense circuits and a portion of the touchscreen processing module of a touchscreen.

FIG. 19 is a schematic block diagram of a grounded device touch example of a few drive-sense circuits and a portion of the touchscreen processing module of a touchscreen 25 that is similar to FIG. 18, with the difference being a grounded device touch as represented by the device capacitance $C_x$. In this example, the self capacitance and mutual capacitance of each electrode is affected by the device capacitance.

The affected self capacitance of the column electrode 85c is processed by the first bandpass filter 160 and the frequency interpreter 164 to produce a self capacitance value 168-1a. The mutual capacitance of the column electrode 85c and row electrode is processed by the second bandpass filter 162 and the frequency interpreter 166 to produce a mutual capacitance value 170-1a.

The affected shielded self capacitance of the row electrode 85r is processed by the third bandpass filter 160-1 and the frequency interpreter 164-1 to produce a self capacitance value 168-2a. The affected unshielded self capacitance of the row electrode 85r is processed by the fourth bandpass filter 162-1 and the frequency interpreter 166-1 to produce an unshielded self capacitance value 170-2a.

Figure 20:
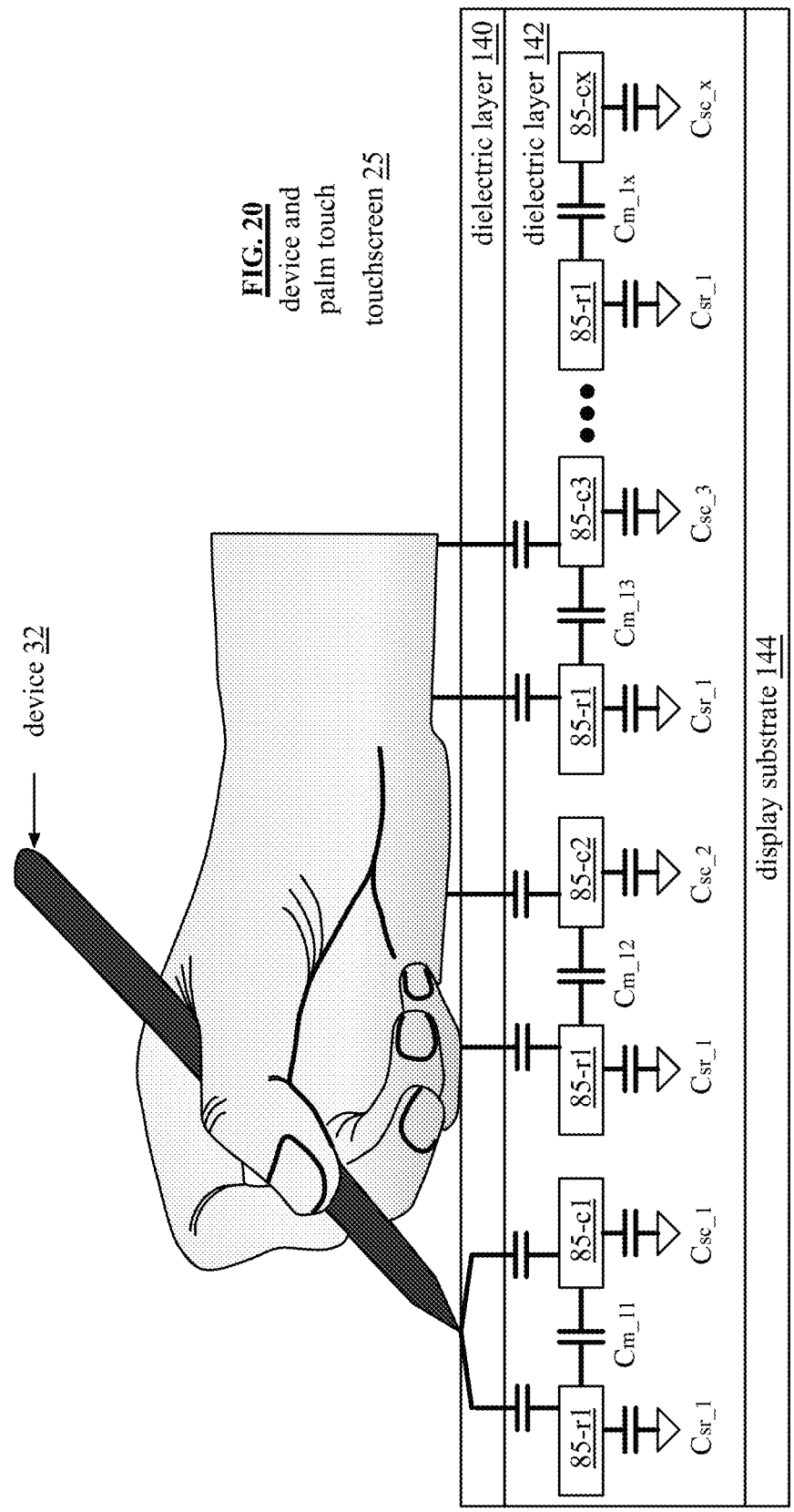
FIG. 20 is a schematic block diagram of an example of capacitance of a touchscreen.

FIG. 20 is a schematic block diagram of an example of capacitance of a touchscreen 25 with contact by a hand holding a device 32 such as a pen. The touchscreen 25 of FIG. 20 is similar to the touchscreen 25 of FIG. 11B except that the hand holding the device 32 and the device 32 are touching the touchscreen 25. The hand and device are capacitively connected to the touchscreen 25 and affect a plurality of electrodes. For example, the hand has a larger interface area and is affecting the row electrode 85-r1 as well as column electrodes 85-c2 and 85-c3. The pinky finger of the hand has a direct capacitive connection on the touchscreen and the rest of the hand is capacitively coupled from hovering just over the touchscreen. The device 32 has a smaller interface area and is affecting the row electrode 85-r1 and the column electrode 85-c1.

Because the human body has a ground connection, the capacitive connection affects the mutual capacitances and the self capacitances of the affected electrodes 85. The capacitance changes of the row electrode 85-r1 as well as column electrodes 85-c2 and 85-c3 will have different measurements due to the uneven contact with the touchscreen 25. The smaller interface area of the device 32 results in a smaller, consistently distributed capacitance effect on less electrodes in comparison to the greater, more inconsistently distributed capacitance effect in the larger interface area of the hand. A smaller capacitance effect on less electrodes near the larger capacitance effect on multiple electrodes can be distinguished as a touch whereas the larger capacitance effect on multiple electrodes can be ignored.

FIG. 21 is a schematic block diagram of an embodiment of a pressure assembly 208 for use within a passive device (e.g., a passive pen or stylus) for interacting with a touchscreen 25. The pressure assembly 208 includes a conductive contact 210, a mounting structure 212, a compressible conductor 214, and a firm spherical conductor 218 (e.g., a conductive sphere). The conductive contact 210 (e.g., a wire) is coupled to the compressible conductor 214 through the mounting structure 212. The mounting structure 212 couples the compressible conductor 214 to a passive device (e.g., a pen). The contact conductor 210 is operable to couple to another conductive section of the passive device for creating a capacitively coupled connection from a user's hand to the touchscreen 25.

The firm spherical conductor 218 is a hard conductive structure with at least two curved surfaces (a curved surface directed toward the touchscreen 25 and a curved surface directed toward the compressible conductor 214). The firm spherical conductor 218 is made of a rigid conductive material such as conductive metal or conductive polymer such as carbon. The firm spherical conductor 218 is firm such that when pressure is placed on the firm spherical conductor 218 against the touchscreen 25, the firm spherical conductor 218 does not change shape.

The compressible conductor 214 may be cylindrical in shape as shown, including a flat top surface and a flat bottom surface. The compressible conductor 214 could consist of other shapes having a flat bottom surface for contact with the conductive sphere and a flat top surface for contact with the mounting structure 212. The compressible conductor 214 consists of a compressible conductive material such that when pressure is applied to the compressible conductor 214 against the rigid spherical conductor, the compressible conductor 214 changes shape. The compressible conductor 214 may consist of conductive materials embedded in a compressible carrier (i.e., a compressive material), such as silicone rubber. For example, the compressible conductor 214 is made of a Standard Elastomeric Conductor Material (ECM). ECM is a form elastomer, often natural rubber, silicone or other flexible substitutes, with embedded conductive particles within.

FIG. 21 depicts an example of no compression where the firm spherical conductor 218 rests on the touchscreen 25 creating a lower contact point 220 and the compressive conductor 214 rests on the firm spherical conductor 218 creating an upper contact point 216 (e.g., where the compressive conductor has a flat bottom for contact with the firm spherical conductor). The lower contact point 220 of the firm spherical conductor on the touchscreen 25 has a constant diameter (area) point of contact, even when the pressure assembly 208 is tilted.

FIG. 22 is a schematic block diagram of an embodiment of a pressure assembly 208 for use within a passive device (e.g., a passive pen or stylus) for interacting with a touchscreen 25. The pressure assembly 208 includes a conductive contact 210, a mounting structure 212, a compressible conductor 214, and a firm spherical conductor 218. In FIG. 22, a downward (Z-direction) pressure movement is applied that compresses the compressible conductor 214 against the firm spherical conductor 218.

Because the firm spherical conductor 218 is rigid and the compressible conductor 214 is mounted in place, the Z-direction pressure movement compresses the compressible conductor 214 at the upper contact point 216 of the firm spherical conductor 218. The compression of the flat side of the compressible conductor 214 against the curved face of the firm spherical conductor 218, changes the upper contact point 216 from a point (as shown in FIG. 21) to a larger domed-shaped compression. The change in surface area between the firm spherical conductor 218 and the compressible conductor 214 decreases the impedance between the contact conductor 210 and the touchscreen 25. The increase in the surface contact between the firm spherical conductor 218 and the compressible conductor 214 will also increase the capacitance between the contact conductor 210 and the touchscreen 25. Pressure on the lower contact point, increases the capacitance by compressing the firm spherical conductor 218 and the compressible conductor 214 together and not by increasing the lower contact point size on the touchscreen 25.

The capacitance change (e.g., capacitance of a passive device increases with compression) affects electrical characteristics of sensors of the touchscreen. Based on the change in electrical characteristics of the sensors, a touchscreen processing module interprets the change in electrical characteristics of the sensors as impedance values. When the impedance values are within a first range, the touchscreen processing module interprets the impedance values as a touch. When the impedance values are within a second range, the touchscreen processing module interprets the impedance values as a pressure measurement where the second range is lower (i.e., the capacitance is higher) than the first range. The pressure measurement determined is an absolute measurement.

In an example, measurement of the z pressure is decoded by the touchscreen processing module as a scaled percentage of the difference between the minimum and maximum energy values from a touch on the touchscreen 25. As a specific example, if a touch is represented by a value in the range between 0 to 255 (8-bit binary value) when the touchscreen processing module is calibrated, with the minimum (0 or 0%) and maximum (255 or 100%) signal values, a pressure value is reported as a dynamic value within that range.

When the impedance values are within a third range, the touchscreen processing module interprets the impedance values as a hover where the third range is higher (i.e., the capacitance is lower) than the first range. The touchscreen processing module is operable to attribute the pressure measurement, touch, and/or hover and/or various actions as various inputs (e.g., when the device capacitance is at a higher end of a pressure range, a user is pressing the pen to indicate a darker stroke, when the capacitance is within the touch range and a double tap occurs, the user is performing a selection function, etc.).

Figure 23:
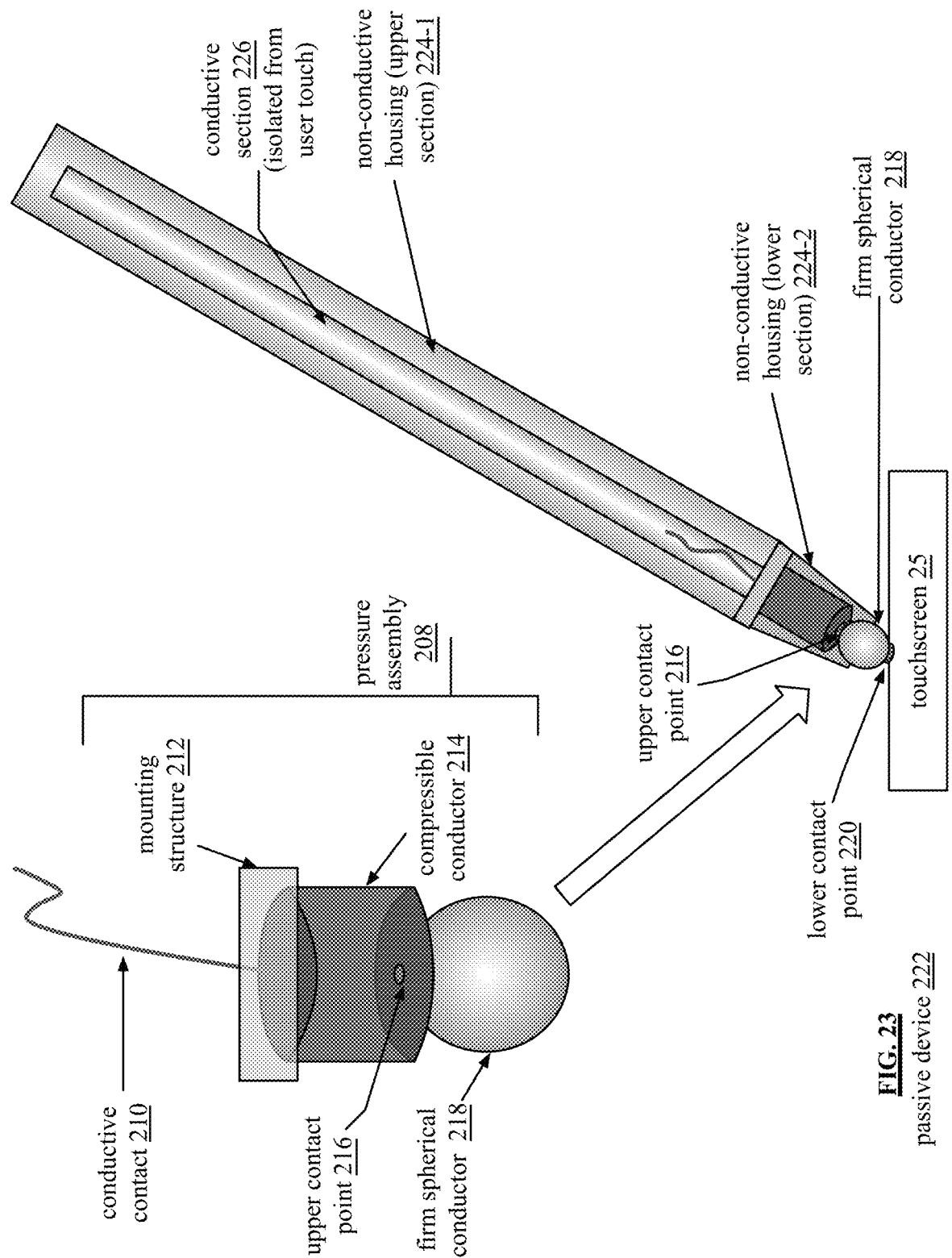
FIG. 23 is a schematic block diagram of an embodiment of a passive device having a pressure assembly.

FIG. 23 is a schematic block diagram of an embodiment of a passive device 22 (e.g., a passive pen or stylus) having a pressure assembly 208. In addition to the pressure assembly 208 (as discussed with reference to FIGS. 21-22), the passive device 22 includes a conductive section 226 (e.g., an internal conductive ground plane isolated from user touch) and a non-conductive pen housing 224. An upper section of the non-conductive pen housing 224-1 houses the conductive section 226 and a lower section of the non-conductive pen housing 224-2 (e.g., a pen cone) houses the pressure assembly 208.

The pressure assembly 208 includes a conductive contact 210 (e.g., shown here as a wire), a mounting structure 212, a compressible conductor 214, and a firm spherical conductor 218. The conductive contact 210 is coupled to the compressible conductor 214 through the mounting structure 212. The mounting structure 212 couples the compressible conductor 214 to the passive device (e.g., one or more of the non-conductive housing and the conductive section). The contact conductor 210 couples the conductive section 226 to the compressible conductor 214 for creating a capacitively coupled connection from a user's hand to the touchscreen 25. In another embodiment, the mounting section of the pressure assembly may consist of a conductive material and directly couple to the conductive section.

When a user touches the non-conductive housing 224-1, capacitive coupling occurs between the user's body and the conductive section 226 through to the firm spherical conductor 218. The touchscreen 25 is operable to detect changes in electrical characteristics of electrodes of the touchscreen due to the presence of a capacitance such as the passive device 222 capacitance. As pressure is applied to the firm spherical conductor 218 (e.g., as a user is pressing the firm spherical conductor 218 on the touchscreen), the compressible conductor 214 compresses, which causes a change in capacitance of the passive device 222 that is interpretable by the touchscreen 22 as a pressure measurement.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a touch screen controller, the method comprises:
    detecting, by the touch screen controller, contact of a passive device with a touch screen at a touch screen contact point by:
        detecting capacitance of a user's body via the passive device at the touch screen contact point, wherein the capacitance of the user's body is coupled through a non-conductive housing, a conductive section, and a pressure assembly of the passive device; and
    determining, by the touch screen controller, pressure of the passive device at the touch screen contact point by:
        determining a variance in the detected capacitance of the user's body as the pressure of the passive device varies, wherein the variance of the detected capacitance occurs based on variance of pressure applied via the non-conductive housing to a compressible conductor of the pressure assembly, which transfers at least some of the pressure to a first spherical conductor of the pressure assembly, wherein the first spherical conductor contacts the touch screen at the touch screen contact point; and interpreting the variance in the detected capacitance to determine the pressure of the passive device.

2. The method of claim 1 further comprises:

determining, by the touch screen controller, a change in a first self-capacitance due to the detected capacitance of the user's body, wherein the first self-capacitance is detected by a first drive sense circuit of the touch screen controller;

determining, by the touch screen controller, a change in a second self-capacitance due to the detected capacitance of the user's body, wherein the second self-capacitance is detected by a second drive sense circuit of the touch screen controller; and determining, by the touch screen controller, the touch screen contact point based on the changes of the first and second self-capacitance.

3. The method of claim 2 further comprises:

determining a change in mutual-capacitance due to the detected capacitance of the user's body, wherein the mutual capacitance is detected by the first or the second drive sense circuit; and determining, by the touch screen controller, the touch screen contact point based on the changes of the first and second self-capacitance and further based on the change in the mutual capacitance.

4. The method of claim 1, wherein the determining the pressure of the passive device comprises:

determining, by the touch screen controller, an initial change in a self-capacitance due to an initial level of the detected capacitance of the user's body at initial contact of the passive device with the touch screen contact point, wherein the self-capacitance is detected by a drive sense circuit of the touch screen controller; and determining, by the touch screen controller, a subsequent change in the self-capacitance due to a subsequent level of the detected capacitance of the user's body of the passive device with the touch screen contact point, wherein, when an increase in the self-capacitance corresponds to an increase in pressure.

5. The method of claim 1, wherein the determining the pressure of the passive device comprises:

determining, by the touch screen controller, an initial change in a mutual-capacitance due to an initial level of the detected capacitance of the user's body at initial contact of the passive device with the touch screen contact point, wherein the mutual-capacitance is detected by a drive sense circuit of the touch screen controller; and determining, by the touch screen controller, a subsequent change in the mutual-capacitance due to a subsequent level of the detected capacitance of the user's body of the passive device with the touch screen contact point, wherein, when a decrease in the mutual-capacitance corresponds to an increase in pressure.

6. The method of claim 1, wherein the determining the pressure of the passive device comprises:

detecting the pressure is a z-direction with respect to the touch screen regardless of angle of the passive device with respect to a surface of the touch screen.

7. A computer readable memory device comprises:

a first memory section that stores operational instructions that, when executed by a touch screen controller, causes the touch screen controller to:

detect contact of a passive device with a touch screen at a touch screen contact point by:

detecting capacitance of a user's body via the passive device at the touch screen contact point, wherein the capacitance of the user's body is coupled through a non-conductive housing, a conductive section, and a pressure assembly of the passive device; and a second memory section that stores operational instructions that, when executed by the touch screen controller, causes the touch screen controller to:

determine pressure of the passive device at the touch screen contact point by:

determining a variance in the detected capacitance of the user's body as the pressure of the passive device varies, wherein the variance of the detected capacitance occurs based on variance of pressure applied via the non-conductive housing to a compressible conductor of the pressure assembly, which transfers at least some of the pressure to a first spherical conductor of the pressure assembly, wherein the first spherical conductor contacts the touch screen at the touch screen contact point; and interpreting the variance in the detected capacitance to determine the pressure of the passive device.

8. The computer readable memory device of claim 7, wherein the first memory section further stores operational instructions that, when executed by the touch screen controller, causes the touch screen controller to:

determine a change in a first self-capacitance due to the detected capacitance of the user's body, wherein the first self-capacitance is detected by a first drive sense circuit of the touch screen controller;

determine a change in a second self-capacitance due to the detected capacitance of the user's body, wherein the second self-capacitance is detected by a second drive sense circuit of the touch screen controller; and determine the touch screen contact point based on the changes of the first and second self-capacitance.

9. The computer readable memory device of claim 8, wherein the first memory section further stores operational instructions that, when executed by the touch screen controller, causes the touch screen controller to:

determine a change in mutual-capacitance due to the detected capacitance of the user's body, wherein the mutual capacitance is detected by the first or the second drive sense circuit; and determine the touch screen contact point based on the changes of the first and second self-capacitance and further based on the change in the mutual capacitance.

10. The computer readable memory device of claim 7, wherein the first memory section further stores operational instructions that, when executed by the touch screen controller, causes the touch screen controller to:

determine an initial change in a self-capacitance due to an initial level of the detected capacitance of the user's body at initial contact of the passive device with the touch screen contact point, wherein the self-capacitance is detected by a drive sense circuit of the touch screen controller; and determine a subsequent change in the self-capacitance due to a subsequent level of the detected capacitance of the user's body of the passive device with the touch screen contact point, wherein, when an increase in the self-capacitance corresponds to an increase in pressure.

11. The computer readable memory device of claim 7, wherein the first memory section further stores operational instructions that, when executed by the touch screen controller, causes the touch screen controller to:
  determine an initial change in a mutual-capacitance due to an initial level of the detected capacitance of the user's body at initial contact of the passive device with the touch screen contact point, wherein the mutual-capacitance is detected by a drive sense circuit of the touch screen controller; and
  determine a subsequent change in the mutual-capacitance due to a subsequent level of the detected capacitance of the user's body of the passive device with the touch screen contact point, wherein, when a decrease in the mutual-capacitance corresponds to an increase in pressure.

12. The computer readable memory device of claim 7, wherein the second memory section further stores operational instructions that, when executed by the touch screen controller, causes the touch screen controller to determine the pressure of the passive device by:
  detecting the pressure is a z-direction with respect to the touch screen regardless of angle of the passive device with respect to a surface of the touch screen.

* * * * *